US012593322B2

(12) United States Patent
Agarwal et al.

(10) Patent No.: US 12,593,322 B2
(45) Date of Patent: Mar. 31, 2026

(54) BANDWIDTH PART CONFIGURATION TECHNIQUES FOR WIRELESS COMMUNICATIONS SYSTEMS

(71) Applicant: QUALCOMM Incorporated, San Diego, CA (US)

(72) Inventors: Ravi Agarwal, San Diego, CA (US); Peerapol Tinnakornsrisuphap, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 17/997,654

(22) PCT Filed: Jun. 24, 2021

(86) PCT No.: PCT/US2021/038977
§ 371 (c)(1),
(2) Date: Oct. 31, 2022

(87) PCT Pub. No.: WO2021/263041
PCT Pub. Date: Dec. 30, 2021

(65) Prior Publication Data
US 2023/0224883 A1      Jul. 13, 2023

Related U.S. Application Data

(60) Provisional application No. 63/044,936, filed on Jun. 26, 2020.

(51) Int. Cl.
H04W 72/0457      (2023.01)
H04W 72/23      (2023.01)
H04W 72/50      (2023.01)

(52) U.S. Cl.
CPC ....... H04W 72/0457 (2023.01); H04W 72/23 (2023.01); H04W 72/50 (2023.01)

(58) Field of Classification Search
CPC . H04W 72/0457; H04W 72/23; H04W 72/50; H04W 72/0453
See application file for complete search history.

(56) References Cited

U.S. PATENT DOCUMENTS

2015/0373587 A1      12/2015      Josiam et al.
2019/0132845 A1*      5/2019      Babaei ................. H04L 1/1812
(Continued)

FOREIGN PATENT DOCUMENTS

CN      106341898 A      1/2017
CN      107483359 A      12/2017
CN      108449286 A      8/2018

OTHER PUBLICATIONS

Apple Inc: "UE Power Saving Techniques", 3GPP Draft, 3GPP TSG-RAN WG1 Meeting #96, R1-1902771, Power Saving Techniques Based on UE Adaptation, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019 (Feb. 16, 2019), XP051600466, pp. 1-15, sections 1-3, Sect. 2.1, 2.2. 2.3. 2.7, sections 1 to 2.1.3, figures 4-6.
(Continued)

*Primary Examiner* — Michael K Phillips
(74) *Attorney, Agent, or Firm* — Holland & Hart LLP

(57)      ABSTRACT
Methods, systems, and devices for wireless communications are described. A base station and a user equipment (UE) may communicate in a wire-less communications system. The base station may select a first bandwidth part from a plurality of bandwidth parts, the first bandwidth part having a bandwidth size corresponding to a traffic burst size for application data traffic within a time period. The UE may determine
(Continued)

the bandwidth size using one or more parameters and indicate the bandwidth size to the base station. Additionally or alternatively, the base station may determine the bandwidth size using the one or more parameters. The base station may transmit, to the UE, a control signal indicating the first band-width part having the bandwidth size. The base station may schedule transmission of the application data traffic using the first bandwidth part and communicate the application data traffic with the UE using the first bandwidth part.

28 Claims, 15 Drawing Sheets

(56)                    References Cited

U.S. PATENT DOCUMENTS

| | | | | |
|---|---|---|---|---|
| 2019/0174323 | A1* | 6/2019 | Go | H04L 43/16 |
| 2019/0261405 | A1 | 8/2019 | Ang et al. | |
| 2019/0281545 | A1* | 9/2019 | Kim | H04W 52/0216 |
| 2020/0037247 | A1* | 1/2020 | Liao | H04W 52/0216 |
| 2020/0098186 | A1 | 3/2020 | Xue et al. | |
| 2020/0128529 | A1 | 4/2020 | Wang et al. | |
| 2020/0245233 | A1* | 7/2020 | Qian | H04W 48/18 |
| 2020/0288449 | A1* | 9/2020 | Shen | H04L 5/003 |
| 2020/0374767 | A1* | 11/2020 | Kuang | H04W 74/0833 |
| 2021/0037505 | A1* | 2/2021 | Kim | H04L 5/0094 |
| 2021/0337467 | A1* | 10/2021 | Li | H04W 52/367 |

OTHER PUBLICATIONS

CMCC: "Discussion on UE Power Saving Schemes with Adaption to UE Traffic", 3GPP TSG RAN WG1 #96, 3GPP Draft, R1-1903344, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 22, 2019, 14 Pages, XP051601021, sections 3 and 4, section 1, "Introduction" section 4. "BWP configuration for video streaming", paragraph [0004], figures 10-12.
International Search Report and Written Opinion—PCT/US2021/038977—ISA/EPO—Oct. 29, 2021.
Apple Inc: "BWP of Size Zero for UE Power Saving", 3GPP TSG-RAN WG1 #91, R1-1720546, Reno, US, Nov. 27-Dec. 1, 2017, Nov. 18, 2017, pp. 1-6.
CMCC: "Discussion on UE power saving schemes with adaption to UE traffic", 3GPP TSG RAN WG1 #96, R1-1903344, Athens, Greece, Feb. 25-Mar. 1, 2019, Feb. 22, 2019, 14 Pages.
SONY: "Operation of PDCCH-based power saving channel", 3GPP Tsg Ran WG1 #98, R1- 1908785, Prague, Czech Republic, Aug. 26-30, 2019, Aug. 17, 2019, 9 Pages.

* cited by examiner

510

515

520

505

500

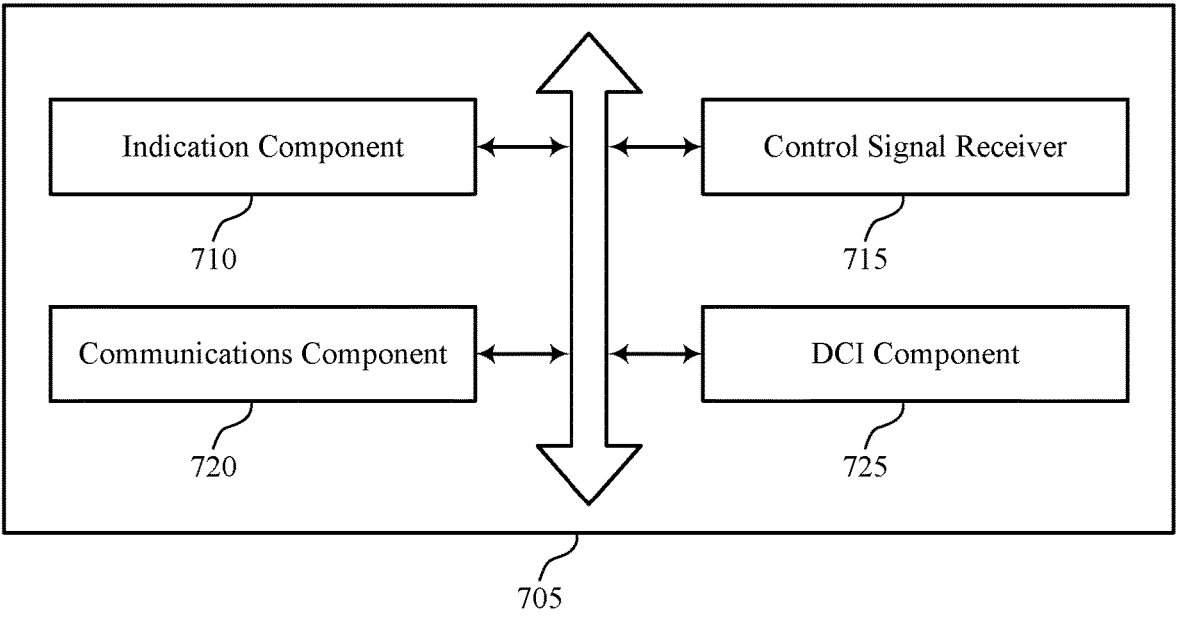
Indication Component
710
Communications Component
720
Control Signal Receiver
715
DCI Component
725
705
700
FIG. 7

910

915

920

905

900

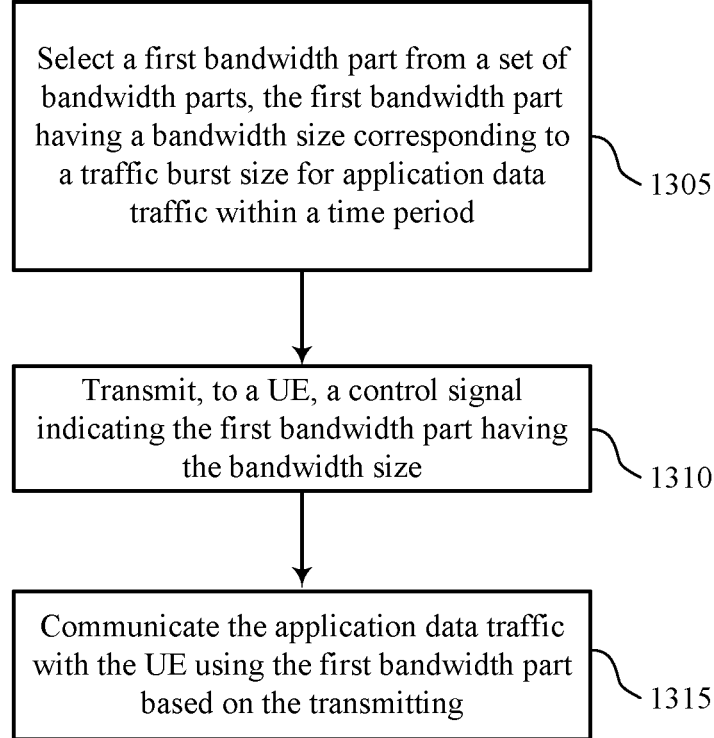

Select a first bandwidth part from a set of bandwidth parts, the first bandwidth part having a bandwidth size corresponding to a traffic burst size for application data traffic within a time period

1305

Transmit, to a UE, a control signal indicating the first bandwidth part having the bandwidth size

1310

Communicate the application data traffic with the UE using the first bandwidth part based on the transmitting

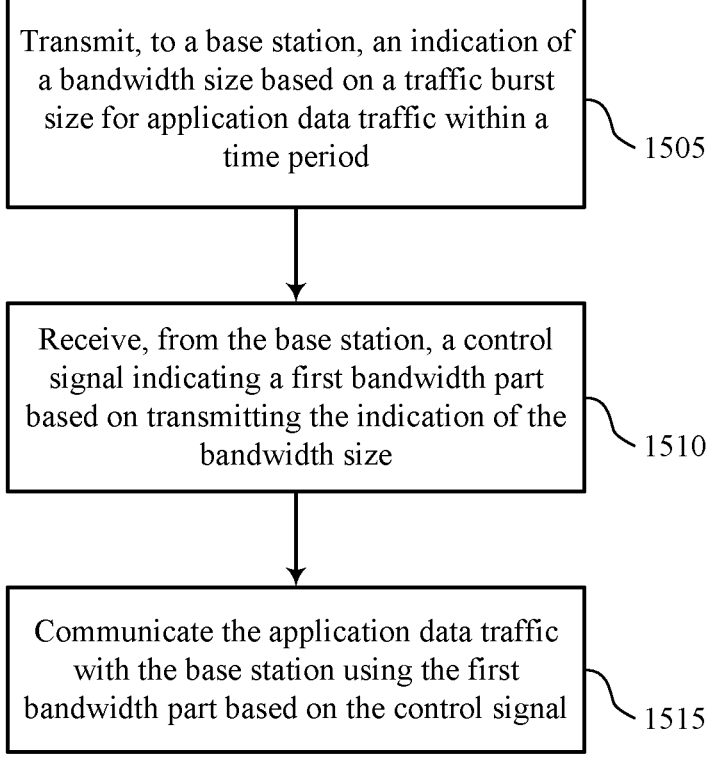

Transmit, to a base station, an indication of a bandwidth size based on a traffic burst size for application data traffic within a time period

1505

Receive, from the base station, a control signal indicating a first bandwidth part based on transmitting the indication of the bandwidth size

1510

Communicate the application data traffic with the base station using the first bandwidth part based on the control signal

BANDWIDTH PART CONFIGURATION TECHNIQUES FOR WIRELESS COMMUNICATIONS SYSTEMS

CROSS REFERENCE

The present Application is a 371 national stage filing of International PCT Application No. PCT/US2021/038977 by Agarwal et al. entitled "BANDWIDTH PART CONFIGU-RATION TECHNIQUES FOR WIRELESS COMMUNI-CATIONS SYSTEMS," filed Jun. 24, 2021; and claims priority to U.S. Provisional Patent Application No. 63/044,936 by Agarwal et al., entitled "BANDWIDTH PART CONFIGURATION TECHNIQUES FOR WIRELESS COMMUNICATIONS SYSTEMS," filed Jun. 26, 2020, each of which is assigned to the assignee hereof, and each of which is expressly incorporated by reference in its entirety herein.

FIELD OF TECHNOLOGY

The following relates generally to wireless communications and more specifically to bandwidth part configuration techniques for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplex-ing (DFT-S-OFDM).

A wireless multiple-access communications system may include one or more base stations or one or more network access nodes, each simultaneously supporting communica-tion for multiple communication devices, which may be otherwise known as user equipment (UE). A UE and a base station may communicate data in a wireless communications system. For example, the base station may configure the UE with a bandwidth part for uplink or downlink communica-tions. However, conventional methods for configuring a bandwidth part may result in relatively inefficient commu-nications, high power consumption at the UE, or both.

SUMMARY

The described techniques relate to improved methods, systems, devices, and apparatuses that support bandwidth part configuration techniques for wireless communications systems. Generally, the described techniques enable a device of a wireless communications system (e.g., a base station or a user equipment (UE)) to determine a bandwidth size for a bandwidth part based on one or more parameters. For example, a base station may configure a UE (e.g., via control signaling) with a bandwidth part for communication of application data traffic. The base station may select the bandwidth part from a set of bandwidth parts based on the bandwidth part having a bandwidth size (e.g., a frequency range) corresponding to a traffic burst size (e.g., an estimated traffic burst size) for the application data traffic. In some examples, the base station may determine the bandwidth size and configure the UE with a bandwidth part that satisfies the determined bandwidth size. In some other examples, the UE may determine the bandwidth size and indicate a requested bandwidth size to the base station, which may enable the base station to configure the bandwidth part in accordance with the indicated bandwidth size.

As an illustrative example, a device may determine a bandwidth size capable of carrying a burst of application data within a time period (e.g., a slot). In some examples, the device may estimate a transport block size for the burst of the application data traffic (e.g., the estimated traffic burst size may be an example of the estimated transport block size) based on a quality of service (QOS) profile, an average transport block size used for previous communications, or both, among other examples. The device may determine the bandwidth size based on one or more parameters. For example, the device may determine the bandwidth size based on the transport block size, a modulation order, a target code rate, a quantity of layers, a quantity of downlink symbols used to schedule the communications, a physical layer overhead parameter, a statistical metric of the one or more parameters (e.g., an average, a standard deviation, a maximum, etc.), or any combination thereof.

A method of wireless communications at a base station is described. The method may include selecting a first band-width part from a set of bandwidth parts, the first bandwidth part having a bandwidth size corresponding to a traffic burst size for application data traffic within a time period, trans-mitting, to a UE, a control signal indicating the first band-width part having the bandwidth size, and communicating the application data traffic with the UE using the first bandwidth part based on the transmitting.

An apparatus for wireless communications at a base station is described. The apparatus may include a processor, memory coupled with the processor, and instructions stored in the memory. The instructions may be executable by the processor to cause the apparatus to select a first bandwidth part from a set of bandwidth parts, the first bandwidth part having a bandwidth size corresponding to a traffic burst size for application data traffic within a time period, transmit, to a UE, a control signal indicating the first bandwidth part having the bandwidth size, and communicate the application data traffic with the UE using the first bandwidth part based on the transmitting.

Another apparatus for wireless communications at a base station is described. The apparatus may include means for selecting a first bandwidth part from a set of bandwidth parts, the first bandwidth part having a bandwidth size corresponding to a traffic burst size for application data traffic within a time period, transmitting, to a UE, a control signal indicating the first bandwidth part having the band-width size, and communicating the application data traffic with the UE using the first bandwidth part based on the transmitting.

A non-transitory computer-readable medium storing code for wireless communications at a base station is described. The code may include instructions executable by a processor to select a first bandwidth part from a set of bandwidth parts, the first bandwidth part having a bandwidth size correspond-ing to a traffic burst size for application data traffic within a time period, transmit, to a UE, a control signal indicating the first bandwidth part having the bandwidth size, and communicate the application data traffic with the UE using the first bandwidth part based on the transmitting.

In some examples of the method, apparatuses, and non-transitory computer-readable medium described herein, transmitting the control signal may include operations, features, means, or instructions for transmitting the control signal indicating the first bandwidth part with the bandwidth size corresponding to the traffic burst size that may be an estimated transport block size of the application data traffic.

In some examples of the method, apparatuses, and non-transitory computer-readable medium described herein, transmitting the control signal may include operations, features, means, or instructions for transmitting the control signal indicating the first bandwidth part with the bandwidth size corresponding to the traffic burst size, where the bandwidth size may be estimated corresponding to a modulation order of the application data traffic.

In some examples of the method, apparatuses, and non-transitory computer-readable medium described herein, transmitting the control signal may include operations, features, means, or instructions for transmitting the control signal indicating the first bandwidth part with the bandwidth size corresponding to the traffic burst size, where the bandwidth size may be estimated corresponding to a target code rate applied to encode the application data traffic.

In some examples of the method, apparatuses, and non-transitory computer-readable medium described herein, transmitting the control signal may include operations, features, means, or instructions for transmitting the control signal indicating the first bandwidth part with the bandwidth size corresponding to the traffic burst size, where the bandwidth size may be estimated corresponding to a quantity of one or more spatial layers over which the application data traffic may be transmitted.

In some examples of the method, apparatuses, and non-transitory computer-readable medium described herein, transmitting the control signal may include operations, features, means, or instructions for transmitting the control signal indicating the first bandwidth part with the bandwidth size corresponding to the traffic burst size, where the bandwidth size may be estimated corresponding to a quantity of one or more downlink symbols used for scheduling the application data traffic.

In some examples of the method, apparatuses, and non-transitory computer-readable medium described herein, transmitting the control signal may include operations, features, means, or instructions for transmitting the control signal indicating the first bandwidth part with the bandwidth size corresponding to the traffic burst size, where the bandwidth size may be estimated corresponding to a quantity of physical layer overhead corresponding to the application data traffic.

In some examples of the method, apparatuses, and non-transitory computer-readable medium described herein, transmitting the control signal may include operations, features, means, or instructions for transmitting the control signal indicating the first bandwidth part with the bandwidth size corresponding to the traffic burst size that may be one or more statistical metrics of a parameter of the application data traffic.

In some examples of the method, apparatuses, and non-transitory computer-readable medium described herein, a statistical metric of the one or more statistical metrics includes an average of the parameter, a standard deviation of the parameter, a maximum of the parameter, or any combination thereof.

Some examples of the method, apparatuses, and non-transitory computer-readable medium described herein may further include operations, features, means, or instructions for receiving, from an access and mobility management function, a QoS profile for the application data traffic, where the traffic burst size may be estimated based on the QoS profile.

Some examples of the method, apparatuses, and non-transitory computer-readable medium described herein may further include operations, features, means, or instructions for calculating the estimated transport block size based on a default burst size indicated in the QoS profile.

In some examples of the method, apparatuses, and non-transitory computer-readable medium described herein, the traffic burst size may be an average transport block size scheduled to the UE over a duration of time that accounts for one or more protocol headers of the application data traffic.

In some examples of the method, apparatuses, and non-transitory computer-readable medium described herein, the traffic burst size may be based on a quantity of bits received at the base station, the UE, or both over a duration of time.

In some examples of the method, apparatuses, and non-transitory computer-readable medium described herein, scheduling the transmission of the application data traffic may include operations, features, means, or instructions for scheduling a burst of the application data traffic within the time period that may be a single slot, where the bandwidth size may be determined based on the burst of the application data traffic being scheduling within the single slot.

In some examples of the method, apparatuses, and non-transitory computer-readable medium described herein, scheduling the transmission of the application data traffic may include operations, features, means, or instructions for scheduling a burst of the application data traffic within the time period that may be two or more slots based on the traffic burst size for the application data traffic being larger than a permitted burst size for a maximum bandwidth size of a single slot, where the bandwidth size allocated to the two or more slots includes an entire bandwidth of a carrier for communicating the application data traffic based on the scheduling.

Some examples of the method, apparatuses, and non-transitory computer-readable medium described herein may further include operations, features, means, or instructions for establishing a communications session with the UE using a first bit rate for communicating the application data traffic, where the control signal indicates the first bandwidth part with the bandwidth size in accordance with the first bit rate, adjusting the communications session or establishing a second communications session with the UE using a second bit rate for the application data traffic, and transmitting a second control signal that indicates a second bandwidth part with a second bandwidth size in accordance with the second bit rate, the second bandwidth size being different than the bandwidth size.

In some examples of the method, apparatuses, and non-transitory computer-readable medium described herein, the application data traffic includes split cross reality application data, the traffic burst size includes an estimated traffic burst size, or any combination thereof.

A method of wireless communications at a UE is described. The method may include transmitting, to a base station, an indication of a bandwidth size based on a traffic burst size for application data traffic within a time period, receiving, from the base station, a control signal indicating a first bandwidth part based on transmitting the indication of the bandwidth size, and communicating the application data traffic with the base station using the first bandwidth part based on the control signal.

An apparatus for wireless communications at a UE is described. The apparatus may include a processor, memory coupled with the processor, and instructions stored in the memory. The instructions may be executable by the processor to cause the apparatus to transmit, to a base station, an indication of a bandwidth size based on a traffic burst size for application data traffic within a time period, receive, from the base station, a control signal indicating a first bandwidth part based on transmitting the indication of the bandwidth size, and communicate the application data traffic with the base station using the first bandwidth part based on the control signal.

Another apparatus for wireless communications at a UE is described. The apparatus may include means for transmitting, to a base station, an indication of a bandwidth size based on a traffic burst size for application data traffic within a time period, receiving, from the base station, a control signal indicating a first bandwidth part based on transmitting the indication of the bandwidth size, and communicating the application data traffic with the base station using the first bandwidth part based on the control signal.

A non-transitory computer-readable medium storing code for wireless communications at a UE is described. The code may include instructions executable by a processor to transmit, to a base station, an indication of a bandwidth size based on a traffic burst size for application data traffic within a time period, receive, from the base station, a control signal indicating a first bandwidth part based on transmitting the indication of the bandwidth size, and communicate the application data traffic with the base station using the first bandwidth part based on the control signal.

In some examples of the method, apparatuses, and non-transitory computer-readable medium described herein, receiving the control signal may include operations, features, means, or instructions for receiving the control signal indicating the first bandwidth part with the bandwidth size determined based on the traffic burst size that may be an estimated transport block size of the application data traffic.

In some examples of the method, apparatuses, and non-transitory computer-readable medium described herein, receiving the control signal may include operations, features, means, or instructions for receiving the control signal indicating the first bandwidth part with the bandwidth size determined based on the traffic burst size, where the bandwidth size may be estimated corresponding a modulation order of the application data traffic.

In some examples of the method, apparatuses, and non-transitory computer-readable medium described herein, receiving the control signal may include operations, features, means, or instructions for receiving the control signal indicating the first bandwidth part with the bandwidth size determined based on the traffic burst size, where the bandwidth size may be estimated corresponding to a target code rate applied to encode the application data traffic.

In some examples of the method, apparatuses, and non-transitory computer-readable medium described herein, receiving the control signal may include operations, features, means, or instructions for receiving the control signal indicating the first bandwidth part with the bandwidth size determined based on the traffic burst size, where the bandwidth size may be estimated corresponding to a quantity of one or more spatial layers over which the application data traffic may be transmitted.

In some examples of the method, apparatuses, and non-transitory computer-readable medium described herein, receiving the control signal may include operations, features, means, or instructions for receiving the control signal indicating the first bandwidth part with the bandwidth size determined based on the traffic burst size, where the bandwidth size may be estimated corresponding to a quantity of one or more downlink symbols used for scheduling the application data traffic.

In some examples of the method, apparatuses, and non-transitory computer-readable medium described herein, receiving the control signal may include operations, features, means, or instructions for receiving the control signal indicating the first bandwidth part with the bandwidth size determined based at least in part on the traffic burst size, where the bandwidth size may be estimated corresponding to a quantity of physical layer overhead corresponding to the application data traffic.

In some examples of the method, apparatuses, and non-transitory computer-readable medium described herein, receiving the control signal may include operations, features, means, or instructions for receiving the control signal indicating the first bandwidth part with the bandwidth size determined based on the traffic burst size that may be one or more statistical metrics of a parameter of the application data traffic.

In some examples of the method, apparatuses, and non-transitory computer-readable medium described herein, a statistical metric of the one or more statistical metrics includes an average of the parameter, a standard deviation of the parameter, a maximum of the parameter, or any combination thereof.

In some examples of the method, apparatuses, and non-transitory computer-readable medium described herein, the traffic burst size may be based on a quantity of bits received at the base station, the UE, or both over a duration of time.

Some examples of the method, apparatuses, and non-transitory computer-readable medium described herein may further include operations, features, means, or instructions for receiving downlink control information indicating scheduling information for the application data traffic, where communicating the application data traffic may be based on the indicated scheduling information.

In some examples of the method, apparatuses, and non-transitory computer-readable medium described herein, the UE includes a cross reality device, the application data traffic includes split cross reality application data traffic, the traffic burst size comprises an estimated traffic burst size, or any combination thereof.

BRIEF DESCRIPTION OF THE DRAWINGS

FIG. 7 shows a block diagram of a communications manager in accordance with aspects of the present disclosure.

FIGS. 13 through 15 show flowcharts illustrating methods in accordance with aspects of the present disclosure.

DETAILED DESCRIPTION

Figure 1:
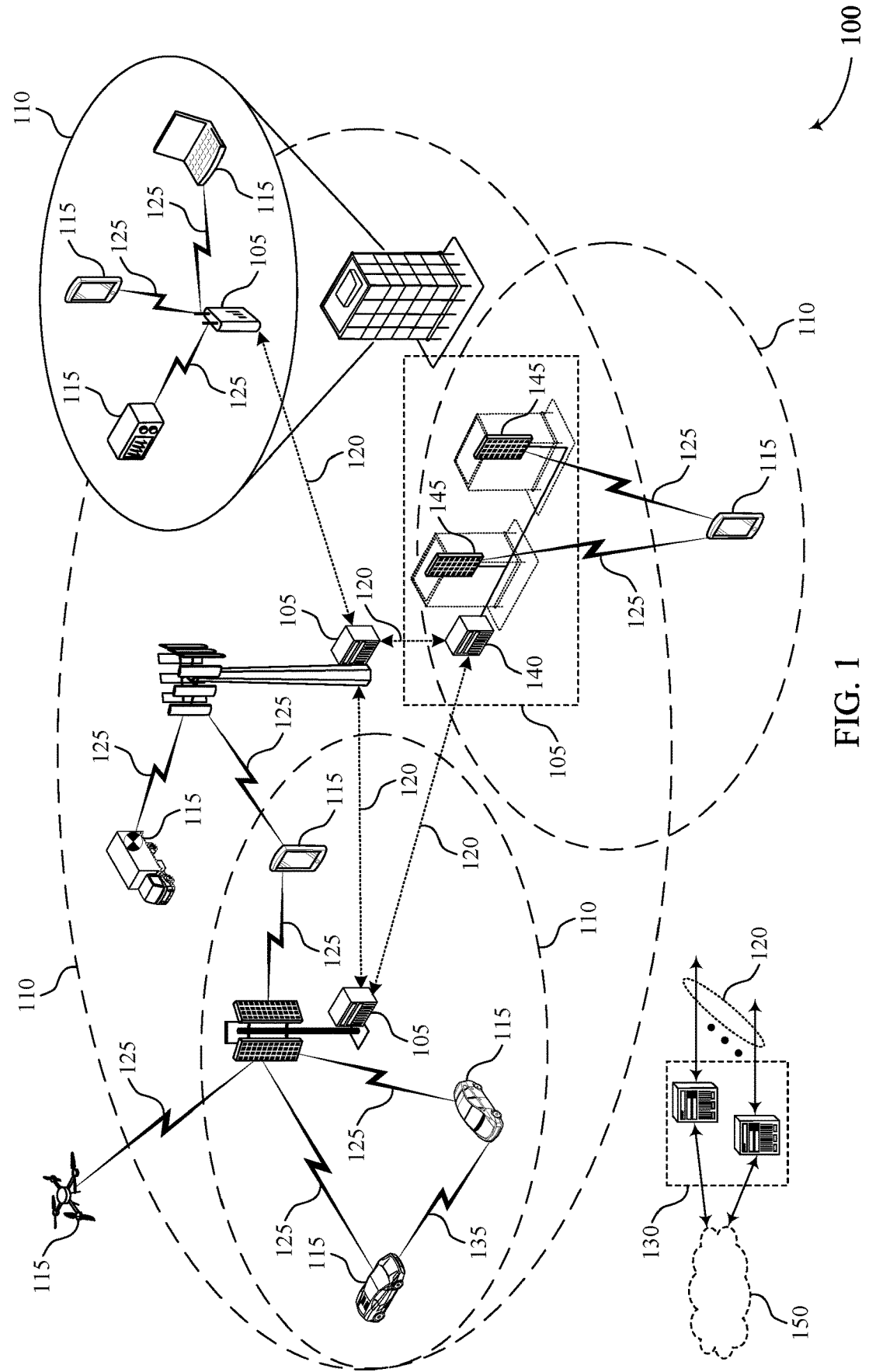
FIG. 1 illustrates an example of a system for wireless communications in accordance with aspects of the present disclosure.

A base station and a user equipment (UE) may communicate in a wireless communications system. For example, the base station may schedule the UE for one or more data transmissions (e.g., uplink transmissions or downlink transmissions of application data traffic for an application of the UE). The base station may configure the UE with a bandwidth part for such communications. However, in some cases configuring the bandwidth part may result in relatively inefficient communications, high power consumption at the UE, or both. For example, the UE may be configured with a bandwidth part having a bandwidth size spanning an entire carrier bandwidth, which may result in relatively inefficient power usage at the UE (e.g., if the UE is capable of using less bandwidth while maintaining latency and throughput thresholds for application data traffic, such as for split cross reality (XR) applications with relatively predictable throughput and periodicity, among other examples).

According to the techniques described herein, a device of a wireless communications system (e.g., a base station or a UE) may determine a bandwidth size for a bandwidth part based on one or more parameters, such as a traffic burst size (e.g., an estimated traffic burst size). For example, a base station may configure a UE (e.g., via control signaling) with a bandwidth part for communication of application data traffic. The base station may select the bandwidth part from a set of bandwidth parts based on the selected bandwidth part having a bandwidth size (e.g., a frequency range) corresponding to a traffic burst size for the application data traffic (e.g., an estimated traffic burst size for the application data traffic), among other examples of parameters. As an illustrative example, a device may use the estimated application burst size to determine a bandwidth size capable of carrying a burst of application data within a time period (e.g., a bandwidth size large enough to transmit an estimated burst of application data within a slot, among other examples of time periods). In some examples, the determined bandwidth size may be relatively smaller than an entire bandwidth size available for a carrier. In such examples, a UE may realize enhanced power savings, among other advantages (e.g., due to the UE communicating over a smaller bandwidth size than a carrier bandwidth). In some other examples, the bandwidth size may span the carrier bandwidth (e.g., if the estimated burst of application data is large enough to use multiple time periods, such as slots, in order to successfully communicate the data over the bandwidth part), which may ensure throughput and latency thresholds, among other advantages.

The device may estimate a transport block size for the burst of the application data traffic (e.g., a traffic burst size may be an example of the estimated transport block size) based on a quality of service (QOS) profile, an average transport block size used for previous scheduled communications, or both, among other examples. In some examples, the device may determine the bandwidth size based on one or more parameters, such as the transport block size, a modulation order, a target code rate, a quantity of layers, a quantity of downlink symbols used to schedule the communications, a physical layer overhead parameter, a statistical metric of the one or more parameters (e.g., an average, a standard deviation, a maximum, etc.), or any combination thereof, among other examples of parameters. In some examples, a base station may allocate a bandwidth part with a second bandwidth size higher than the determined bandwidth size, for example, to accommodate traffic fluctuations (e.g., temporal fluctuations due to a modulation order used for scheduling, a burst size generated by a server, etc.). In some examples, the base station may determine the size and configure the bandwidth part in accordance with the determined size. In some other examples, the UE may determine the size and indicate the size to the base station, which may enable the base station to configure the bandwidth part in accordance with the determined size.

Aspects of the disclosure are initially described in the context of wireless communications systems. Aspects of the disclosure are then described in the context of resource schemes and process flows. Aspects of the disclosure are further illustrated by and described with reference to apparatus diagrams, system diagrams, and flowcharts that relate to bandwidth part configuration techniques for wireless communications systems.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the wireless communications system may support split XR communications (e.g., split XR application data traffic communicated between a UE 115 and a base station 105). For example, split XR traffic may be an example of downlink communications (e.g., from a server to a device such as a UE 115) including two video streams (e.g., a video stream for each eye of a XR headset device, among other examples). In some cases, the data traffic in each video stream may be generated periodically by a split XR application server. The data traffic may have a periodicity that corresponds to an inverse of a video frame rate (e.g., an inverse of frames per second (fps)). As an illustrative example, a fps of 90 (e.g., 90 Hz) may be inversed to result in a periodicity of 11.12 ms, although any quantities may be used.

In some cases, each video frame of a video stream may be transmitted in its entirety (e.g., the server may transmit an entire video frame) within a short duration (e.g., 2 ms, or any other quantity of time) after it is generated, which may enable real-time XR application data. Such transmission may result in relatively well defined boundaries between successive transmissions. As an illustrative example, traffic for split XR applications may be transmitted in bursts by a server (e.g., via a base station 105). Each burst of data may correspond to bits associated with two rendered video frames (e.g., each burst of data may include bits of a video frame for a left eye and a video frame for a right eye) transmitted over a relatively short duration (e.g., 2 ms) with an inter-arrival time (e.g., a time between arrival of a first burst of data and a second burst of data, for example, of approximately 1 per fps duration). In some examples, the burst size of the application data described herein may vary depending on one or more factors (e.g., based on a content of the frame, a ratio between intra-coded picture frames and predicted picture frames, etc.). In some examples, a throughput or periodicity of split XR communications may be relatively predictable (e.g., a latency and throughput for application data traffic may remain relatively unchanged for a period of time).

In some cases, a base station 105 may schedule a UE 115 for one or more data transmissions (e.g., uplink transmissions or downlink transmissions of application data traffic for an application of the UE 115). The base station 105 may configure the UE 115 with a bandwidth part for such communications. However, in some cases configuring the bandwidth part may result in relatively inefficient communications, high power consumption at the UE 115, or both. For example, the UE 115 may be configured with a bandwidth part having a bandwidth size spanning an entire carrier bandwidth (e.g., 100 MHz bandwidth size, among other examples), which may result in relatively inefficient power usage at the UE 115 (e.g., if the UE 115 is capable of using less bandwidth while satisfying latency and throughput conditions for application data traffic, such as for split XR applications with relatively predictable throughput and periodicity, among other examples). Allocating less than the entire carrier bandwidth may reduce UE modem power consumption, for example, during a Split XR session.

A device of the wireless communications system 100 (e.g., a base station 105 or a UE 115) may determine a bandwidth size for a bandwidth part based on one or more parameters, such as an estimated traffic burst size (e.g., of XR application data traffic, among other examples of traffic and communications). For example, a base station 105 may configure a UE 115 (e.g., via control signaling) with a bandwidth part for communication of application data traffic. The base station may select the bandwidth part from a set of bandwidth parts based on the bandwidth part having a bandwidth size (e.g., a frequency range) corresponding to a traffic burst size (e.g., an estimated traffic burst size) for the application data traffic, among other examples of parameters. As an illustrative example, a device may use the estimated application burst size to determine a bandwidth size capable of carrying a burst of application data within a time period (e.g., a bandwidth size large enough to transmit an estimated burst of application data within a slot, among other examples of time periods). In some examples, the determined bandwidth size may be relatively smaller than a carrier bandwidth size. In such examples, a UE 115 may realize enhanced power savings, among other advantages (e.g., due to the UE 115 communicating over a smaller bandwidth size than a carrier bandwidth). In some other examples, the bandwidth size may span the carrier bandwidth (e.g., if the estimated burst of application data is large enough to use multiple time periods, such as slots, in order to successfully communicate the data over the bandwidth part), which may ensure throughput and latency thresholds, among other advantages.

Figure 2:
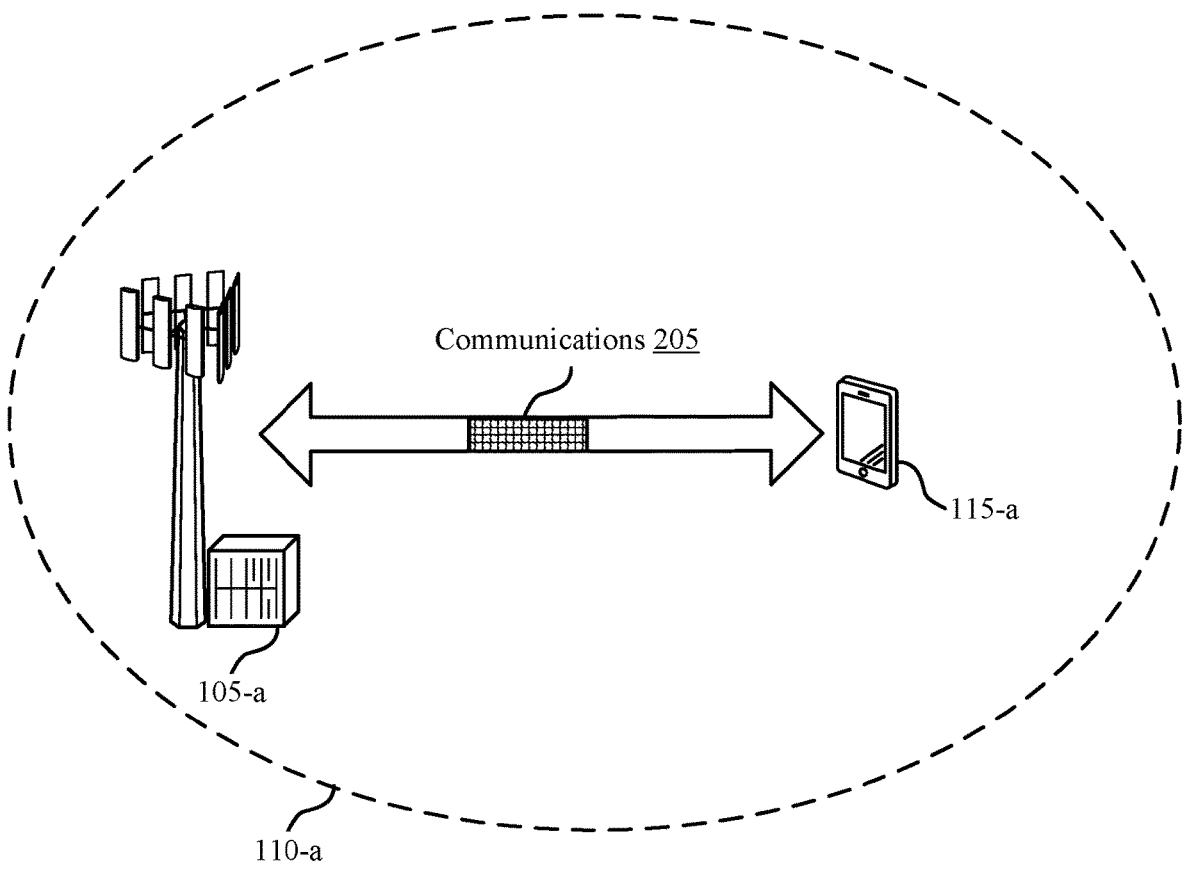
FIG. 2 illustrates an example of a wireless communications system in accordance with aspects of the present disclosure.

FIG. 2 illustrates an example of a wireless communications system 200 in accordance with aspects of the present disclosure. In some examples, the wireless communications system 200 may implement aspects of the wireless communications system 100. For example, the wireless communications system 200 may include a UE 115-a and a base station 105-a, which may be examples of the corresponding devices described with reference to FIG. 1.

The wireless communications system 200 may support communications 205 between the base station 105-a and the UE 115-a within the coverage area 110-a. The communications 205 may include uplink or downlink data transmissions (e.g., application data traffic between the UE 115-a and the base station 105-a). In some examples, the communications 205 may be an example of split XR application data traffic as described with reference to FIG. 1, although it is to be understood that the communications 205 may be an example of any type of communications. For example, data traffic (e.g., application data traffic) as described herein may include or be an example of data, control information, or a combination thereof, among other examples of data, information, or communications. The base station 105-a may schedule the UE 115-a for the communications 205.

The base station 105-a may configure the UE 115-a with a bandwidth part for transmitting or receiving data traffic. In accordance with the techniques described herein, a device (e.g., the base station 105-a or the UE 115-a) may determine a bandwidth size for the bandwidth part based on an estimated size of a burst of data traffic (e.g., a burst of split XR application data traffic, among other examples of data traffic), in addition or alternative to one or more other parameters. In some examples, the UE 115-a may determine the bandwidth size and indicate the bandwidth size to the base station 105-a. Additionally or alternatively, the base station 105-a may determine the bandwidth size and configure the UE 115-a with a bandwidth part in accordance with the bandwidth size.

The base station 105-a may transmit control signaling to the UE 115-a indicating a bandwidth part for communications. The control signaling may include RRC signaling, downlink control messaging (e.g., downlink control information (DCI) on a PDCCH), or a combination thereof. The base station 105-a may select the bandwidth part from a set of bandwidth parts based on a size of the selected bandwidth part (e.g., the selected bandwidth part may have a size corresponding to a calculated bandwidth size for communicating a burst of application traffic). As an illustrative example, the base station 105-a may configure the UE 115-a with a bandwidth part having a bandwidth size such that a burst of application traffic can be scheduled to the UE 115-a within a time period (e.g., an estimated burst of application traffic can be scheduled within one downlink slot). In some examples, scheduling the application traffic within the time period (e.g., within one slot) may enhance (e.g., minimize) latency, improve power savings at the UE 115-a (e.g., due to reducing a quantity of slots used to decode a physical downlink shared channel (PDSCH) message transporting the application data traffic), or both, among other advantages.

The base station 105-a may estimate the bandwidth size associated with a burst of application traffic. For example, the base station 105-a may calculate one or more statistical metrics, such as an average value for a bandwidth (e.g., $n_{prb}$) to allow an estimated burst of application traffic can be scheduled within one downlink slot. Stated alternatively, the bandwidth size may be calculated using a traffic burst size (e.g., an estimated traffic burst size), which may be an example of an estimated transport block size for a burst of the application traffic.

In some examples, the base station 105-a may determine the estimated traffic burst size based on a received indication. For example, an AMF may signal a QoS profile for the application data traffic to the base station 105-a. The base station 105-a may identify the estimated traffic burst size as a transport block size indicated by a parameter of the QoS profile (e.g., a Default Maximum Burst Size parameter may indicate an average transport block size corresponding to a burst of application data traffic). In some examples, the base station 105-a may translate a value of the indicated parameter (e.g., the Default Maximum Burst Size) to a transport block size based on a header size of one or more protocol layers (e.g., a header size of a user datagram protocol (UDP) layer, an internet protocol (IP), a PDCP layer, an RLC protocol layer, a MAC protocol layer, or any combination thereof may be taken into account to translate the value to a transport block size). Additionally or alternatively, the base station 105-a may determine the estimated traffic burst size by tracking a transport block size scheduled to the UE 115-a over a duration of time. For example, the base station 105-a may determine an average transport block size scheduled for previous application data traffic for one or more subsequent time periods. The base station 105-a may use the average transport block size as the estimated traffic burst size.

In some examples, one or more devices (e.g., the base station 105-a, the UE 115-a, or a combination thereof) may estimate the traffic burst size based on a quantity of bits, a duration of time, a sum of sizes of one or more transport blocks, or any combination thereof. For example, a device may determine the estimated traffic burst size as the quantity of bits received at the device (e.g., the UE 115-a or the base station 105-a) over a duration of time, such as a threshold duration of time (e.g., a threshold duration of time indicated to the device via control signaling or other signaling, a threshold duration preconfigured at the device, or a combination thereof). Additionally or alternatively, the device may determine the estimated traffic burst sized based on a sum of transport block sizes scheduled over a duration of time. For example, the base station 105-a may estimate the traffic burst size as a sum of transport block sizes scheduled to the UE 115-a over a duration of time.

The base station 105-a (or the UE 115-a) may determine a bandwidth size in accordance with one or more parameters. In some examples, the base station 105-a may estimate the bandwidth size based on a transport block size. For example, the base station 105-a may calculate a bandwidth size (e.g., $n_{prb}$) using an average transport block size corresponding to a burst of application traffic. Additionally or alternatively, the base station 105-a may estimate the bandwidth size based on a modulation order of the application data traffic. For example, the base station 105-a may calculate a bandwidth size (e.g., $n_{prb}$) using an average modulation order (e.g., $Q_m$) corresponding to scheduled application traffic.

Additionally or alternatively, the base station 105-a may estimate the bandwidth size based on a target code rate of the application data traffic (e.g., an average target code rate which may be denoted as "R"), a quantity of one or more spatial layers over which the application data traffic is transmitted or scheduled (e.g., an average number of layers which may be denoted as "v"), a quantity of one or more symbols used for scheduling the application data traffic (e.g., an average number of downlink symbols which may be denoted as "$N_{symb,sh}$"), a physical layer overhead associated with scheduling the application data traffic (e.g., an amount of physical layer overhead which may be denoted as "$N_{oh,PRB}$"), or any combination thereof. Accordingly, the base station 105-a may calculate an average bandwidth size (e.g., $n_{prb}$) using a transport block size in addition to or alternative to other parameters as described herein, among other examples of parameters.

In some examples, the base station 105-a (or the UE 115-a) may use one or more statistical metrics of the one or more parameters to determine the bandwidth size. For example, the base station 105-a may use averages of one or more parameters (e.g., an average target coding rate, an average modulation order, etc.) over a duration of time to calculate an average bandwidth size. Additionally or alternatively, the base station 105-a may use maximums of one or more parameters, an average plus one or more standard deviations of the one or more parameters, or any combination thereof, among other examples of statistical metrics.

In some examples, the determined bandwidth size may satisfy a threshold (e.g., the calculated bandwidth size may be smaller than a carrier bandwidth size) for scheduling the application data traffic in a time period (e.g., a slot), which may result in improved power consumption at the UE 115-a while ensuring latency and throughput thresholds are satisfied. For example, the UE 115-a may configure its radio frequency circuitry to monitor a bandwidth part with the bandwidth size smaller than an entire carrier frequency, which may save power during the time period.

In some other examples, the determined bandwidth size may fail to satisfy the threshold (e.g., the calculated bandwidth size may be greater than or equal to a carrier bandwidth size) for scheduling the application data traffic in a time period (e.g., a slot). For example, the UE 115-a and the base station 105-a may experience relatively poor channel conditions, and using a reduced bandwidth size for a bandwidth part may result in relatively inefficient communications (e.g., the UE 115-a may fail to successfully receive or decode the communications 205). In such examples, the base station 105-a may allocate an entire carrier bandwidth (e.g., the selected bandwidth part may span the carrier bandwidth), the base station 105-a may schedule a burst of the application data over multiple time periods (e.g., multiple slots), or a combination thereof, which may result in relatively higher reliability communications, among other advantages.

In some examples, the base station 105-a may allocate a bandwidth part with a second bandwidth size higher than the determined bandwidth size (e.g., the base station 105-a may select and configure a bandwidth part having the second bandwidth size). By allocating a bandwidth part with the second bandwidth size, the base station 105-a may accommodate traffic fluctuations (e.g., temporal fluctuations due to a modulation order used for scheduling, a burst size generated by a server, etc.), among other examples, which may result in enhanced communications efficiency and reliability.

The base station 105-a and the UE 115-a may communicate the application data traffic using the configured bandwidth part having a bandwidth size in accordance with the techniques described herein. For example, the base station 105-a may send a burst of application data traffic over one or more slots to the UE 115-a using the bandwidth part (e.g., the bandwidth part having a size equal to an estimated bandwidth size calculated using one or more parameters, or having a second size greater than the estimated bandwidth size).

In some examples, the base station 105-a or the UE 115-a may establish a communications session (e.g., an XR session between an XR application data server and the UE 115-a). For example, the base station 105-a may establish the communications session with the UE using a first bit rate (e.g., a video bit rate for XR data) for communicating application data traffic. In some examples, the communications session may be adjusted. For example, the base station 105-a may adjust the communications session (or establish a second communications session) to use a second bit rate for the application data traffic. In such examples, the base station 105-a may configure different bandwidth part sizes corresponding to the different bit rates. For example, the base station 105-a may configure a first bandwidth part having a first size for the first communications session, and the base station 105-a may configure a second bandwidth part having a second size (e.g., via a second control signal) different than the first size for the adjusted communications session (or the second communications session), in accordance with the techniques described herein. For example, the bandwidth size of a bandwidth part configured for the first bit rate may be different compared to the bandwidth size of the bandwidth part configured for the second bit rate.

Figure 3:
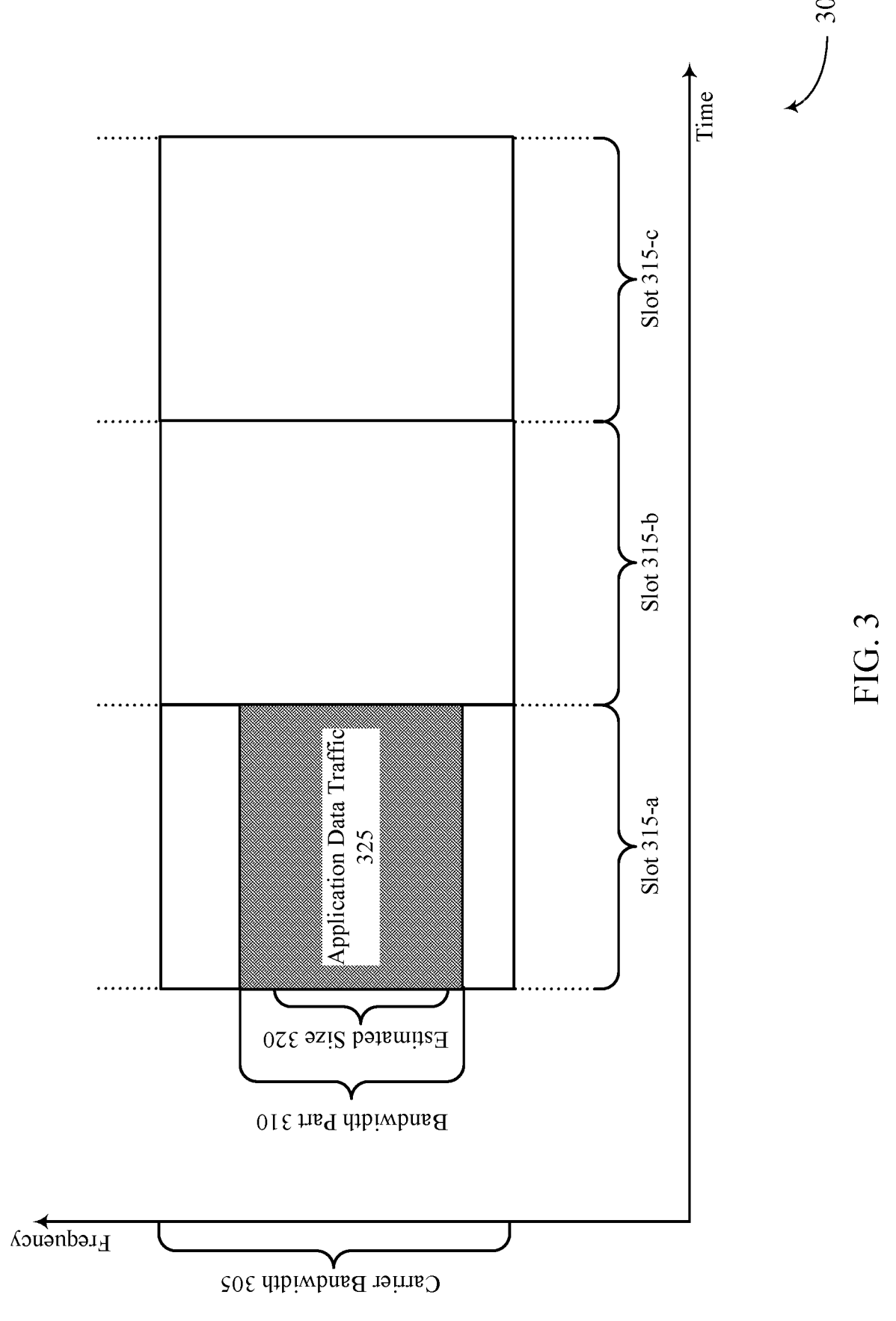
FIG. 3 illustrates an example of a resource scheme in accordance with aspects of the present disclosure.

FIG. 3 illustrates an example of a resource scheme 300 in accordance with aspects of the present disclosure. In some examples, the resource scheme 300 may implement aspects of the wireless communications system 100 or the wireless communications system 200. For example, the resource scheme 300 may illustrate example communications between a UE 115 and a base station 105, which may be examples of the corresponding devices described herein with reference to FIGS. 1 and 2.

A base station may schedule communications with a UE over a set of resources, such as time-frequency resources as illustrated in the resource scheme 300. The base station may configure a bandwidth part 310 within a carrier bandwidth 305 as described herein. The UE or the base station may determine an estimated size 320 for the bandwidth part 310 based on one or more parameters as described herein with reference to FIG. 2. For example, the UE or the base station may determine the estimated size 320 of the bandwidth part 310 using an estimated size of a burst of the application data traffic 325 (e.g., based on statistical metrics of one or more parameters as described herein). The base station may select and indicate the bandwidth part 310 having the estimated size 320 or a second size greater than the estimated size 320 (e.g., to account for traffic variations). In some examples, the estimated size 320 may be referred to as a burst size (e.g., a traffic burst size for application data traffic within a time period such as slot 315-*a*) or an estimated burst size (e.g., an estimated traffic burst size for application data traffic within a time period such as slot 315-*a*). That is, FIG. 3 may illustrate an example of a burst size (e.g., an estimated burst size 320) used to select the bandwidth part 310.

In some examples, the bandwidth part 310 may have a size smaller than the carrier bandwidth 305, for example, if a burst of the application data traffic 325 (e.g., an estimated transport block size for an instance of the application data traffic 325) can be scheduled within the slot 315-*a*. In such examples, the UE and the base station may realize improved power consumption while ensuring latency and throughput thresholds of the application data traffic 325 are satisfied. For example, the UE may experience power savings by tuning its analog circuitry to a smaller bandwidth than an entire bandwidth of a carrier.

In some other examples, the bandwidth part 310 may have a size equal to the carrier bandwidth 305, for example, if a burst of the application data traffic 325 is estimated to use multiple slots (e.g., if an estimated application traffic burst size is large enough, channel conditions are relatively poor, or both) in order to ensure successful communications (e.g., higher reliability communications that satisfy a latency threshold or a throughput threshold of the application data traffic 325), among other advantages. Stated alternatively, the estimated traffic burst size for the application data traffic 325 may be larger than a permitted burst size for a maximum bandwidth size of a single slot 315-*a*. For example, the application data traffic 325 may be communicated over a bandwidth part 310 allocated to span the carrier bandwidth 305 for the slot 315-*a* and the slot 315-*b* based on the estimated traffic burst size being larger than the permitted burst size for the maximum bandwidth size of the single slot 315-*a*, although any quantity of slots 315 or bandwidth sizes may be used.

Figure 4:
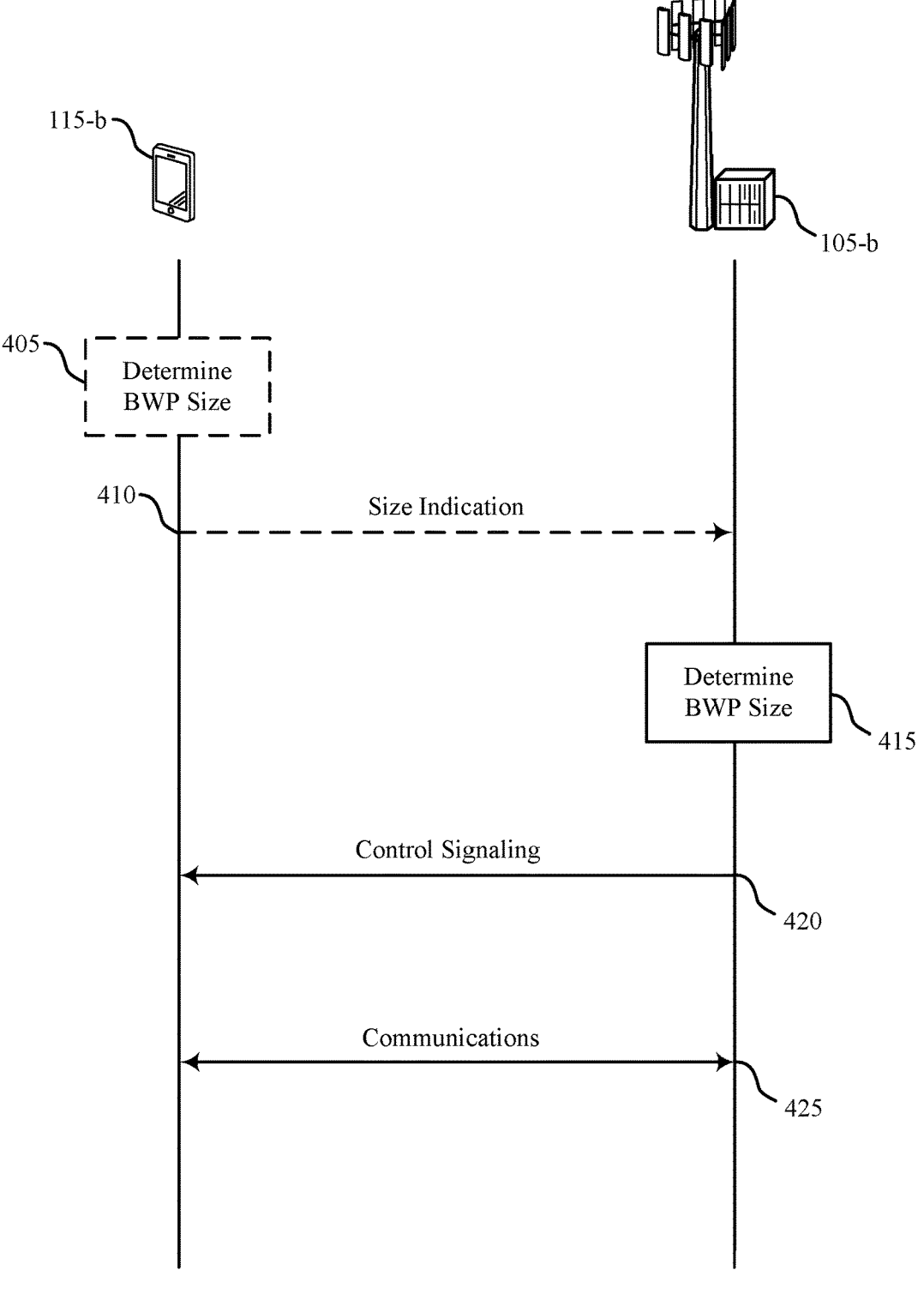
FIG. 4 illustrates an example of a process flow in accordance with aspects of the present disclosure.

FIG. 4 illustrates an example of a process flow 400 in accordance with aspects of the present disclosure. In some examples, the process flow 400 may implement aspects of the wireless communications system 100 or the wireless communications system 200. For example, the process flow 400 may illustrate operations and communications of a base station 105-*b* and a UE 115-*b*, which may be examples of the corresponding devices described herein with reference to FIGS. 1-3. The UE 115-*b* and the base station 105-*b* may communicate using a bandwidth part with a bandwidth size determined according to one or more parameters, as described herein with reference to FIGS. 1-3.

In some examples, at 405 the UE 115-*b* may determine a bandwidth part size. For example, the UE 115-*b* may calculate a first bandwidth part size using one or more parameters, as described herein with reference to FIG. 2. The first bandwidth size may be smaller than a configured carrier bandwidth (e.g., if an estimated burst of application data can be scheduled within a desired time period, such as a slot) or the first bandwidth size may be the same as the configured carrier bandwidth (e.g., if an estimated burst of application data can be scheduled within a set of slots to ensure relatively reliable communications). In some examples, the determined bandwidth part size may be the calculated first bandwidth size. In some other examples, the determined bandwidth size may be a second bandwidth size larger than the calculated first bandwidth size (e.g., to accommodate traffic fluctuations for application data traffic).

In some examples, at 410 the UE 115-*b* may transmit a size indication to the base station 105-*b*. For example, the UE 115-*b* may use uplink control signaling to indicate a bandwidth part size determined at 405 if the UE 115-*b* is configured to determine the bandwidth part size. Additionally or alternatively, the UE 115-*b* may transmit a capability message to the base station 105-*b* (e.g., as part of a connection establishment procedure) prior to the operations shown at 405 and 410.

At 415, the base station 105-*b* may determine a bandwidth part size. For example, the base station 105-*b* may use an indicated bandwidth part size received at 410 to determine the bandwidth part size. In some other examples, the bandwidth part size may be determined at the base station 105-*b* without receiving the indication. For example, the base station 105-*b* may calculate a first bandwidth part size using one or more parameters (e.g., an application traffic burst size, a modulation order, a target coding rate, etc.) as described herein with reference to FIG. 2. The first bandwidth size may be smaller than a configured carrier bandwidth (e.g., if an estimated burst of application data can be scheduled within a desired time period, such as a slot) or the first bandwidth size may be the same as the configured carrier bandwidth (e.g., if an estimated burst of application data can be scheduled within a set of slots to ensure relatively reliable communications). In some examples, the determined bandwidth part size may be the calculated first bandwidth size. In some other examples, the determined bandwidth size may be a second bandwidth size larger than the calculated first bandwidth size (e.g., to accommodate traffic fluctuations for application data traffic).

At 420, the base station 105-*b* may transmit control signaling to the UE 115-*b*. For example, the base station 105-*b* may configure the UE 115-*b* for communications using a bandwidth part having the determined bandwidth size using the control signaling (e.g., RRC signaling, DCI, among other examples of control signaling). In some examples, the base station 105-*b* may select the bandwidth part having the bandwidth size from a set of bandwidth parts.

At 425, the UE 115-*b* and the base station 105-*b* may communicate using the configured bandwidth part. For example, the base station 105-*b* may communicate application data traffic with the UE 115-*b* over the bandwidth part. In some examples, the base station 105-*b* may schedule the communications at 425 (e.g., via control signaling such as a DCI message, among other examples) in accordance with the aspects described herein with reference to FIG. 2.

Figure 5:
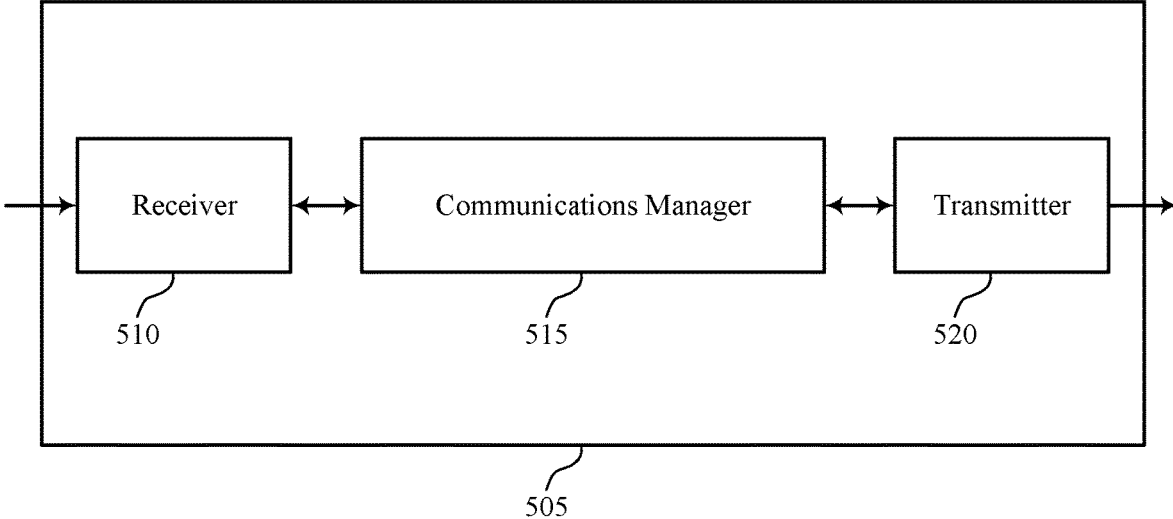
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to bandwidth part configuration techniques for wireless communications systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station, an indication of a bandwidth size based on a traffic burst size for application data traffic within a time period, receive, from the base station, a control signal indicating a first bandwidth part based on transmitting the indication of the bandwidth size, and communicate the application data traffic with the base station using the first bandwidth part based on the control signal. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 515 may be implemented to realize one or more potential advantages at the device 505 or a processor of the device 505 (e.g., controlling the receiver 510, the communications manager 515, or the transmitter 520, for example, of a UE 115). One implementation may allow the device 505 to communicate over a bandwidth part with a bandwidth size relatively smaller than a carrier bandwidth size, which may result in reduced processing complexity at the processor of the device 505 and enhanced power savings at the device 505, among other advantages.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
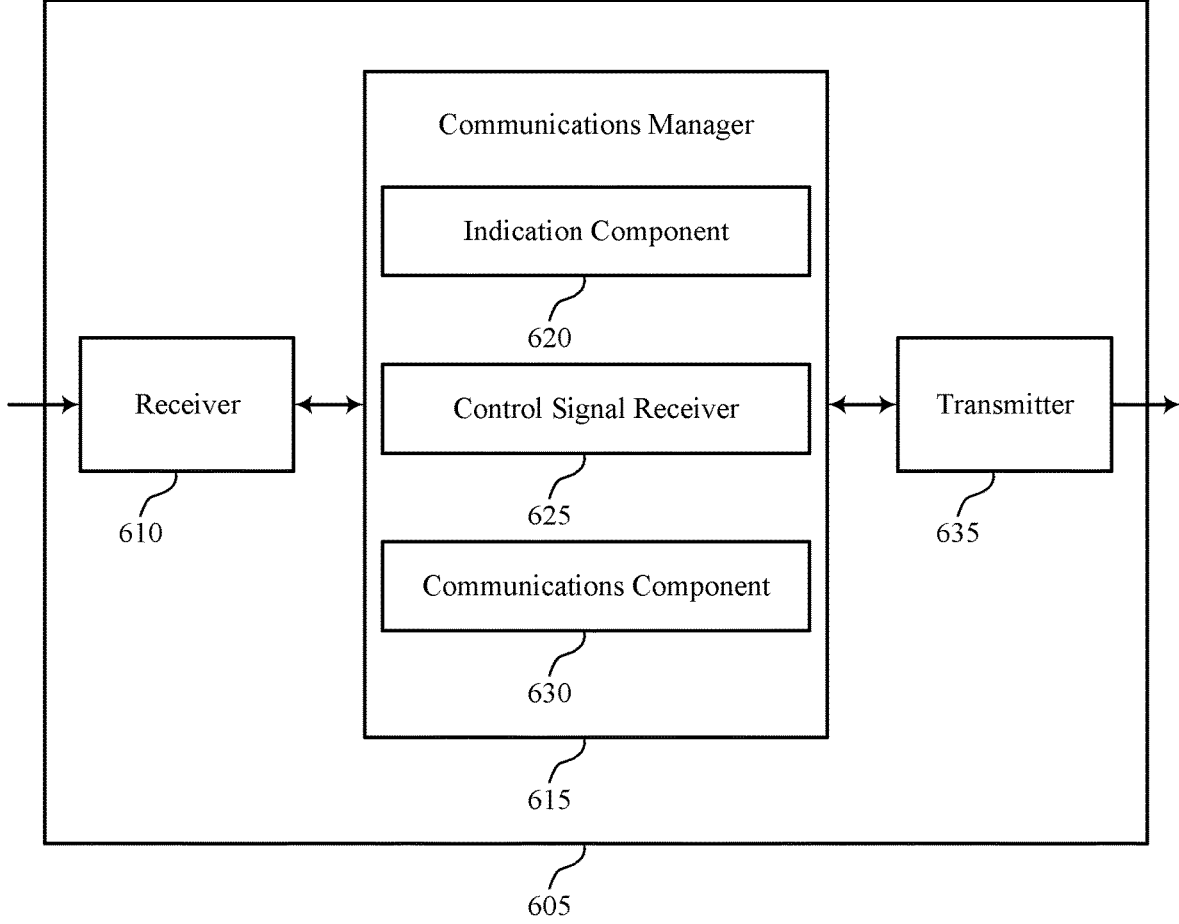

FIG. 6 shows a block diagram 600 of a device 605 in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to bandwidth part configuration techniques for wireless communications systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an indication component 620, a control signal receiver 625, and a communications component 630. The communications manager 615 may be an example of aspects of the communications manager 810 described herein.

The indication component 620 may transmit, to a base station, an indication of a bandwidth size based on a traffic burst size for application data traffic within a time period.

The control signal receiver 625 may receive, from the base station, a control signal indicating a first bandwidth part based on transmitting the indication of the bandwidth size.

The communications component 630 may communicate the application data traffic with the base station using the first bandwidth part based on the control signal.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include an indication component 710, a control signal receiver 715, a communications component 720, and a DCI component 725. Each of these modules may communicate, directly or indirectly, with one another (e.g., via one or more buses).

The indication component 710 may transmit, to a base station, an indication of a bandwidth size based on a traffic burst size for application data traffic within a time period. In some cases, the UE includes a cross reality device, the application data traffic includes split cross reality application data traffic, the traffic burst size includes an estimated traffic burst size, or any combination thereof.

The control signal receiver 715 may receive, from the base station, a control signal indicating a first bandwidth part based on transmitting the indication of the bandwidth size. In some examples, the control signal receiver 715 may receive the control signal indicating the first bandwidth part with the bandwidth size determined based on the traffic burst size that is an estimated transport block size of the application data traffic. In some examples, the control signal receiver 715 may receive the control signal indicating the first bandwidth part with the bandwidth size determined based on the traffic burst size, where the bandwidth size is estimated corresponding a modulation order of the application data traffic.

In some examples, the control signal receiver 715 may receive the control signal indicating the first bandwidth part with the bandwidth size determined based on the traffic burst size, where the bandwidth size is estimated corresponding to a target code rate applied to encode the application data traffic. In some examples, the control signal receiver 715 may receive the control signal indicating the first bandwidth part with the bandwidth size determined based on the traffic burst size, where the bandwidth size is estimated corresponding to a quantity of one or more spatial layers over which the application data traffic is transmitted. In some examples, the control signal receiver 715 may receive the control signal indicating the first bandwidth part with the bandwidth size determined based on the traffic burst size, where the bandwidth size is estimated corresponding to a quantity of one or more downlink symbols used for scheduling the application data traffic.

In some examples, the control signal receiver 715 may receive the control signal indicating the first bandwidth part with the bandwidth size determined based at least in part on the traffic burst size, where the bandwidth size is estimated corresponding to a quantity of physical layer overhead corresponding to the application data traffic. In some examples, the control signal receiver 715 may receive the control signal indicating the first bandwidth part with the bandwidth size determined based on the traffic burst size that is one or more statistical metrics of a parameter of the application data traffic. In some cases, a statistical metric of the one or more statistical metrics includes an average of the parameter, a standard deviation of the parameter, a maximum of the parameter, or any combination thereof. In some cases, the traffic burst size is based on a quantity of bits received at the base station, the UE, or both over a duration of time.

The communications component 720 may communicate the application data traffic with the base station using the first bandwidth part based on the control signal.

The DCI component 725 may receive downlink control information indicating scheduling information for the application data traffic, where communicating the application data traffic is based on the indicated scheduling information.

Figure 8:
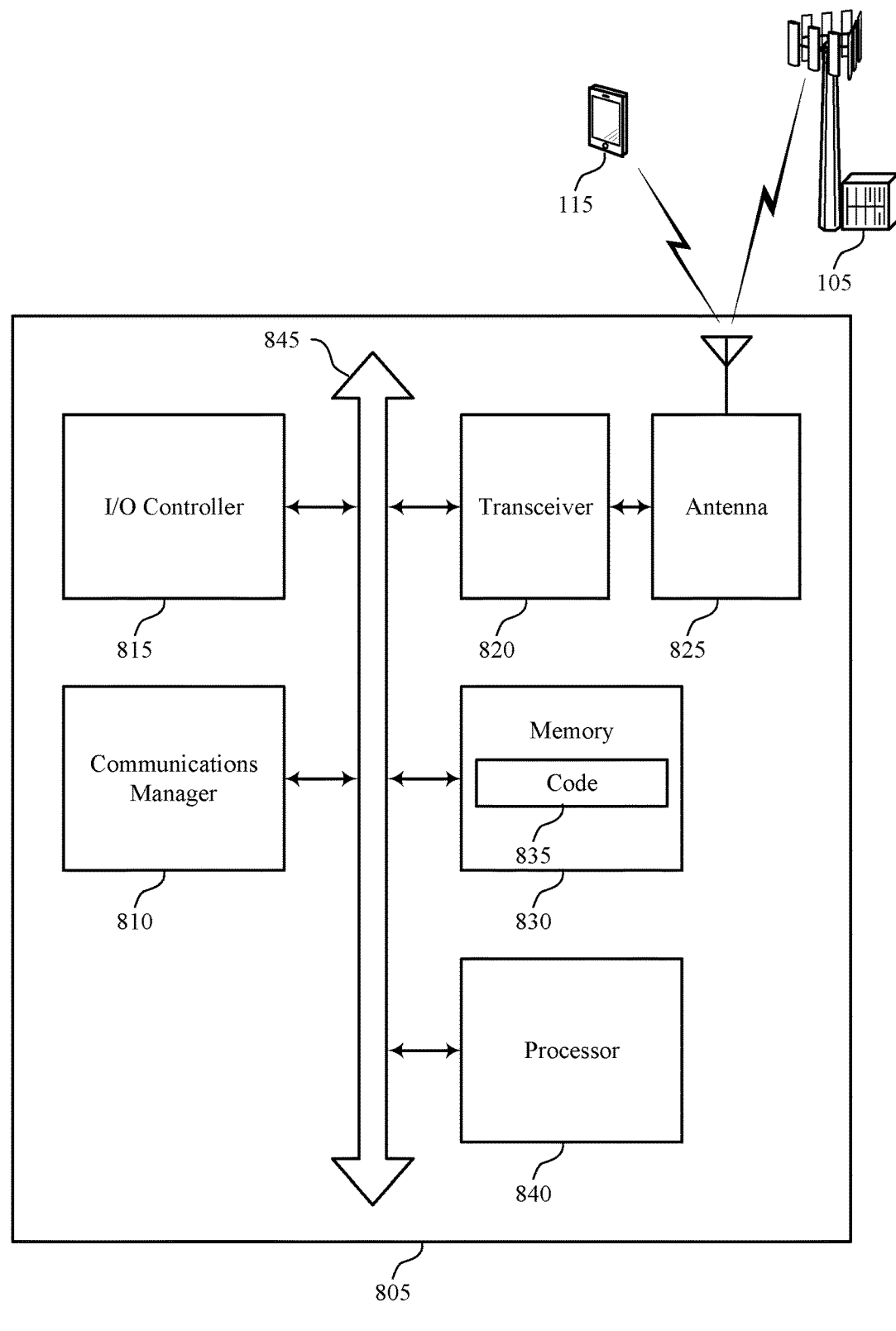
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station, an indication of a bandwidth size based on a traffic burst size for application data traffic within a time period, receive, from the base station, a control signal indicating a first bandwidth part based on transmitting the indication of the bandwidth size, and communicate the application data traffic with the base station using the first bandwidth part based on the control signal.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting bandwidth part configuration techniques for wireless communications systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
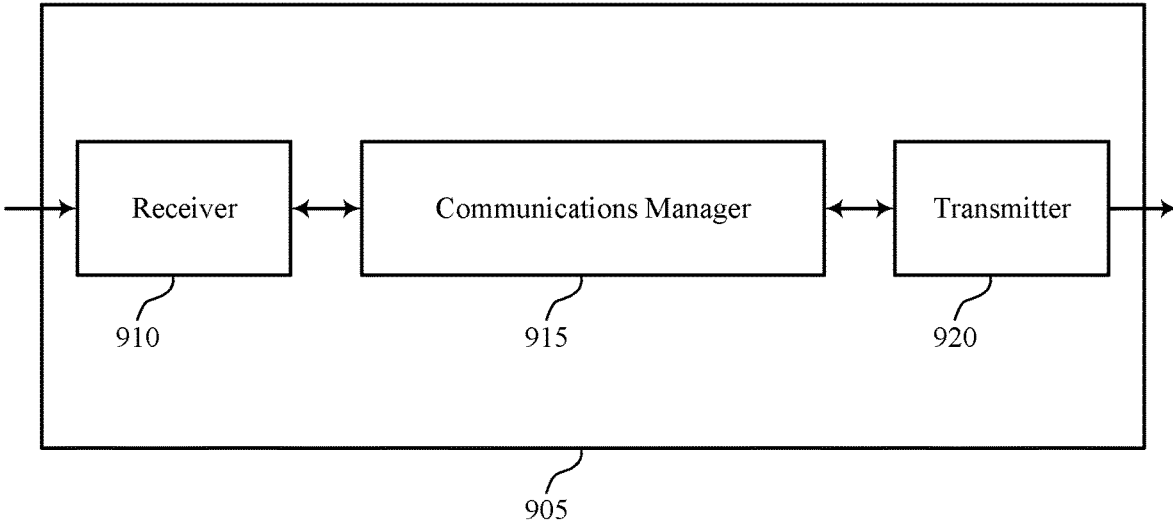
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to bandwidth part configuration techniques for wireless communications systems, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may select a first bandwidth part from a set of bandwidth parts, the first bandwidth part having a bandwidth size corresponding to a traffic burst size for application data traffic within a time period, transmit, to a UE, a control signal indicating the first bandwidth part having the bandwidth size, and communicate the application data traffic with the UE using the first bandwidth part based on the transmitting. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
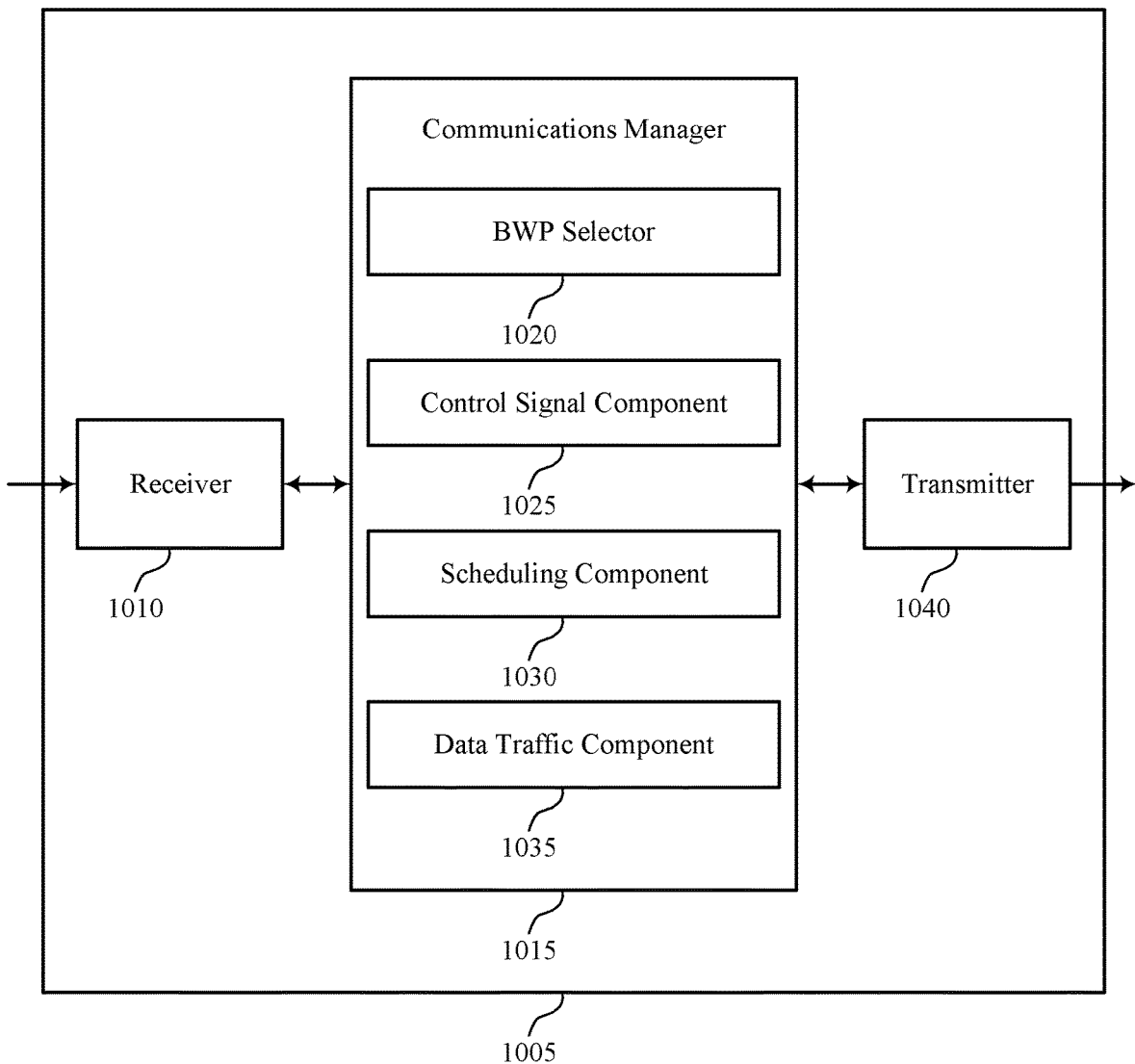

FIG. 10 shows a block diagram 1000 of a device 1005 in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to bandwidth part configuration techniques for wireless communications systems, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a BWP selector 1020, a control signal component 1025, a scheduling component 1030, and a data traffic component 1035. The communications manager 1015 may be an example of aspects of the communications manager 1210 described herein.

The BWP selector 1020 may select a first bandwidth part from a set of bandwidth parts, the first bandwidth part having a bandwidth size corresponding to a traffic burst size for application data traffic within a time period.

The control signal component 1025 may transmit, to a UE, a control signal indicating the first bandwidth part having the bandwidth size.

The scheduling component 1030 may schedule transmission of the application data traffic using the first bandwidth part.

The data traffic component 1035 may communicate the application data traffic with the UE using the first bandwidth part based on the transmitting.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
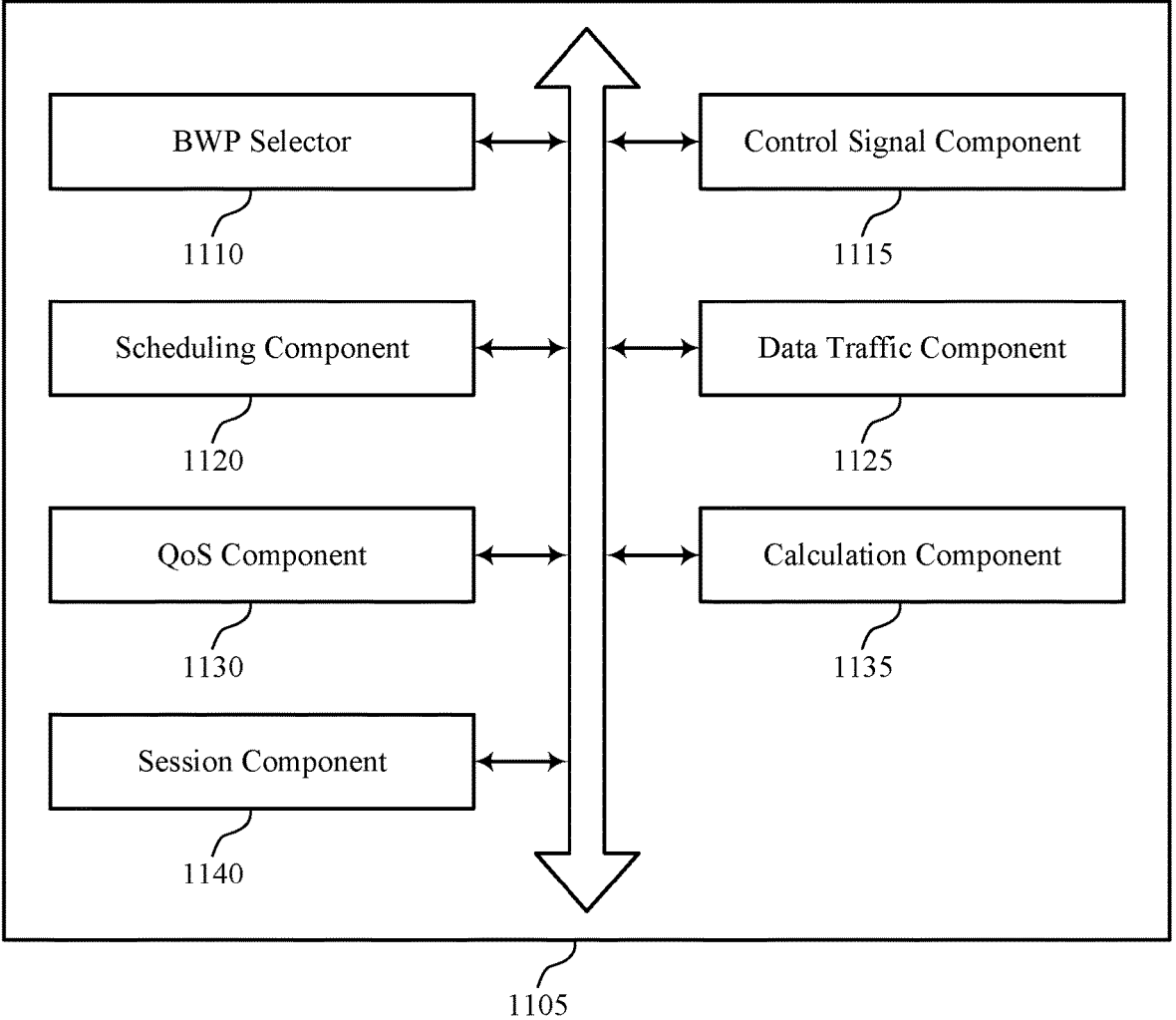
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include a BWP selector 1110, a control signal component 1115, a scheduling component 1120, a data traffic component 1125, a QoS component 1130, a calculation component 1135, and a session component 1140. Each of these modules may communicate, directly or indirectly, with one another (e.g., via one or more buses).

The BWP selector 1110 may select a first bandwidth part from a set of bandwidth parts, the first bandwidth part having a bandwidth size corresponding to a traffic burst size for application data traffic within a time period.

The control signal component 1115 may transmit, to a UE, a control signal indicating the first bandwidth part having the bandwidth size.

In some examples, the control signal component 1115 may transmit the control signal indicating the first bandwidth part with the bandwidth size corresponding to the traffic burst size that is an estimated transport block size of the application data traffic. In some examples, the control signal component 1115 may transmit the control signal indicating the first bandwidth part with the bandwidth size corresponding to the traffic burst size, where the bandwidth size is estimated corresponding to a modulation order of the application data traffic. In some examples, the control signal component 1115 may transmit the control signal indicating the first bandwidth part with the bandwidth size corresponding to the traffic burst size, where the bandwidth size is estimated corresponding to a target code rate applied to encode the application data traffic.

In some examples, the control signal component 1115 may transmit the control signal indicating the first bandwidth part with the bandwidth size corresponding to the traffic burst size, where the bandwidth size is estimated corresponding to a quantity of one or more spatial layers over which the application data traffic is transmitted. In some examples, the control signal component 1115 may transmit the control signal indicating the first bandwidth part with the bandwidth size corresponding to the traffic burst size, where the bandwidth size is estimated corresponding to a quantity of one or more downlink symbols used for scheduling the application data traffic.

In some examples, the control signal component 1115 may transmit the control signal indicating the first bandwidth part with the bandwidth size corresponding to the traffic burst size, where the bandwidth size is estimated corresponding to a quantity of physical layer overhead corresponding to the application data traffic. In some examples, the control signal component 1115 may transmit the control signal indicating the first bandwidth part with the bandwidth size corresponding to the traffic burst size that is one or more statistical metrics of a parameter of the application data traffic.

In some examples, the control signal component 1115 may transmit a second control signal that indicates a second bandwidth part with a second bandwidth size in accordance with the second bit rate, the second bandwidth size being different than the bandwidth size. In some cases, a statistical metric of the one or more statistical metrics includes an average of the parameter, a standard deviation of the parameter, a maximum of the parameter, or any combination thereof. In some cases, the traffic burst size is an average transport block size scheduled to the UE over a duration of time that accounts for one or more protocol headers of the application data traffic. In some cases, the traffic burst size is based on a quantity of bits received at the base station, the UE, or both over a duration of time.

The scheduling component 1120 may schedule transmission of the application data traffic using the first bandwidth part. In some examples, the scheduling component 1120 may schedule a burst of the application data traffic within the time period that is a single slot, where the bandwidth size is determined based on the burst of the application data traffic being scheduling within the single slot.

In some examples, the scheduling component 1120 may schedule a burst of the application data traffic within the time period that is two or more slots based on the traffic burst size for the application data traffic being larger than a permitted burst size for a maximum bandwidth size of a single slot, where the bandwidth size allocated to the two or more slots includes an entire bandwidth of a carrier for communicating the application data traffic based on the scheduling. In some cases, the application data traffic includes split cross reality application data, the traffic burst size includes an estimated traffic burst size, or any combination thereof.

The data traffic component 1125 may communicate the application data traffic with the UE using the first bandwidth part based on the transmitting.

The QoS component 1130 may receive, from an access and mobility management function, a quality of service profile for the application data traffic, where the traffic burst size is estimated based on the quality of service profile.

The calculation component 1135 may calculate the estimated transport block size based on a default burst size indicated in the quality of service profile.

The session component 1140 may establish a communications session with the UE using a first bit rate for communicating the application data traffic, where the control signal indicates the first bandwidth part with the bandwidth size in accordance with the first bit rate. In some examples, the session component 1140 may adjust the communications session or establishing a second communications session with the UE using a second bit rate for the application data traffic.

Figure 12:
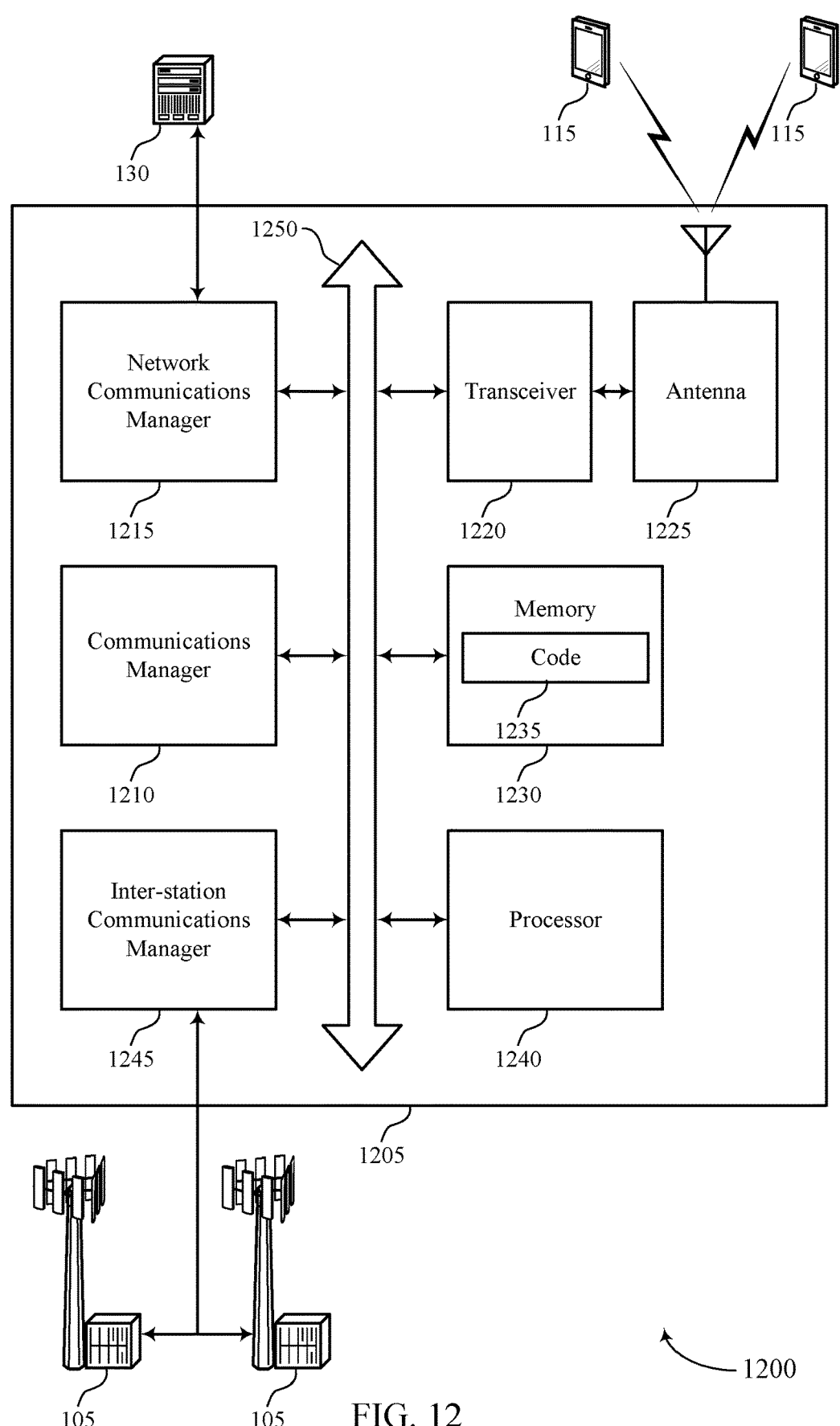
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may select a first bandwidth part from a set of bandwidth parts, the first bandwidth part having a bandwidth size corresponding to a traffic burst size for application data traffic within a time period, transmit, to a UE, a control signal indicating the first bandwidth part having the bandwidth size, and communicate the application data traffic with the UE using the first bandwidth part based on the transmitting.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting bandwidth part configuration techniques for wireless communications systems).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 in accordance with aspects of the present disclosure. The operations of method 1300 may be implemented by a base station 105 or its components as described herein. For example, the operations of method 1300 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1305, the base station may select a first bandwidth part from a set of bandwidth parts, the first bandwidth part having a bandwidth size corresponding to a traffic burst size for application data traffic within a time period. The operations of 1305 may be performed according to the methods described herein. In some examples, aspects of the operations of 1305 may be performed by a BWP selector as described with reference to FIGS. 9 through 12.

At 1310, the base station may transmit, to a UE, a control signal indicating the first bandwidth part having the bandwidth size. The operations of 1310 may be performed according to the methods described herein. In some examples, aspects of the operations of 1310 may be performed by a control signal component as described with reference to FIGS. 9 through 12.

At 1315, the base station may communicate the application data traffic with the UE using the first bandwidth part based on the transmitting. The operations of 1315 may be performed according to the methods described herein. In some examples, aspects of the operations of 1315 may be performed by a data traffic component as described with reference to FIGS. 9 through 12.

Figure 14:
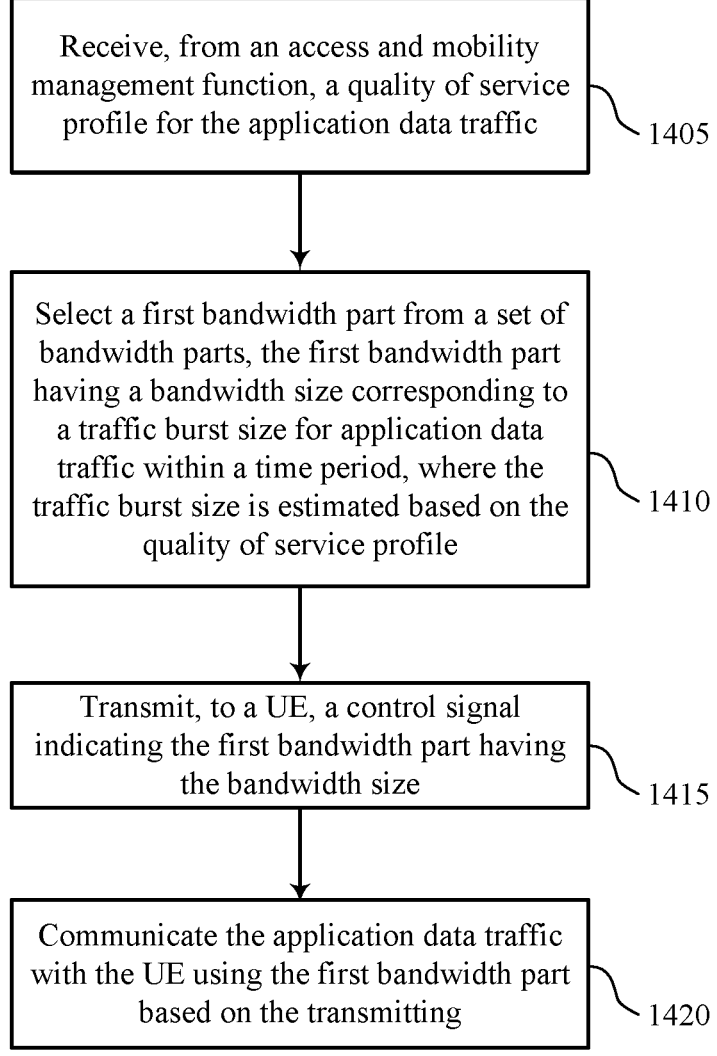

FIG. 14 shows a flowchart illustrating a method 1400 in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may receive, from an access and mobility management function, a quality of service profile for the application data traffic, where the traffic burst size is estimated based on the quality of service profile. The operations of 1405 may be performed according to the methods described herein. In some examples, aspects of the operations of 1405 may be performed by a QoS component as described with reference to FIGS. 9 through 12.

At 1410, the base station may select a first bandwidth part from a set of bandwidth parts, the first bandwidth part having a bandwidth size corresponding to a traffic burst size for application data traffic within a time period. The operations of 1410 may be performed according to the methods described herein. In some examples, aspects of the operations of 1410 may be performed by a BWP selector as described with reference to FIGS. 9 through 12.

At 1415, the base station may transmit, to a UE, a control signal indicating the first bandwidth part having the bandwidth size. The operations of 1415 may be performed according to the methods described herein. In some examples, aspects of the operations of 1415 may be performed by a control signal component as described with reference to FIGS. 9 through 12.

At 1420, the base station may communicate the application data traffic with the UE using the first bandwidth part based on the transmitting. The operations of 1420 may be performed according to the methods described herein. In some examples, aspects of the operations of 1420 may be performed by a data traffic component as described with reference to FIGS. 9 through 12.

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, an indication of a bandwidth size based on a traffic burst size for application data traffic within a time period. The operations of 1505 may be performed according to the methods described herein. In some examples, aspects of the operations of 1505 may be performed by an indication component as described with reference to FIGS. 5 through 8.

At 1510, the UE may receive, from the base station, a control signal indicating a first bandwidth part based on transmitting the indication of the bandwidth size. The operations of 1510 may be performed according to the methods described herein. In some examples, aspects of the operations of 1510 may be performed by a control signal receiver as described with reference to FIGS. 5 through 8.

At 1515, the UE may communicate the application data traffic with the base station using the first bandwidth part based on the control signal. The operations of 1515 may be performed according to the methods described herein. In some examples, aspects of the operations of 1515 may be performed by a communications component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a base station, comprising: selecting a first bandwidth part from a plurality of bandwidth parts, the first bandwidth part having a bandwidth size corresponding to a traffic burst size for application data traffic within a time period; transmitting, to a UE, a control signal indicating the first bandwidth part having the bandwidth size; and communicating the application data traffic with the UE using the first bandwidth part based at least in part on the transmitting.

Aspect 2: The method of aspect 1, wherein transmitting the control signal comprises: transmitting the control signal indicating the first bandwidth part with the bandwidth size corresponding to the traffic burst size that is an estimated transport block size of the application data traffic.

Aspect 3: The method of any of aspects 1 through 2, wherein transmitting the control signal comprises: transmitting the control signal indicating the first bandwidth part with the bandwidth size corresponding to the traffic burst size, wherein the bandwidth size is estimated corresponding to a modulation order of the application data traffic.

Aspect 4: The method of any of aspects 1 through 3, wherein transmitting the control signal comprises: transmitting the control signal indicating the first bandwidth part with the bandwidth size corresponding to the traffic burst size, wherein the bandwidth size is estimated corresponding to a target code rate applied to encode the application data traffic.

Aspect 5: The method of any of aspects 1 through 4, wherein transmitting the control signal comprises: transmitting the control signal indicating the first bandwidth part with the bandwidth size corresponding to the traffic burst size, wherein the bandwidth size is estimated corresponding to a quantity of one or more spatial layers over which the application data traffic is transmitted.

Aspect 6: The method of any of aspects 1 through 5, wherein transmitting the control signal comprises: transmitting the control signal indicating the first bandwidth part with the bandwidth size corresponding to the traffic burst size, wherein the bandwidth size is estimated corresponding to a quantity of one or more downlink symbols used for scheduling the application data traffic.

Aspect 7: The method of any of aspects 1 through 6, wherein transmitting the control signal comprises: transmitting the control signal indicating the first bandwidth part with the bandwidth size corresponding to the traffic burst size, wherein the bandwidth size is estimated corresponding to a quantity of physical layer overhead corresponding to the application data traffic.

Aspect 8: The method of any of aspects 1 through 7, wherein transmitting the control signal comprises: transmitting the control signal indicating the first bandwidth part with the bandwidth size corresponding to the traffic burst size that is one or more statistical metrics of a parameter of the application data traffic.

Aspect 9: The method of aspect 8, wherein a statistical metric of the one or more statistical metrics comprises an average of the parameter, a standard deviation of the parameter, a maximum of the parameter, or any combination thereof.

Aspect 10: The method of any of aspects 1 through 9, further comprising: receiving, from an access and mobility management function, a quality of service profile for the application data traffic, wherein the traffic burst size is estimated based at least in part on the quality of service profile.

Aspect 11: The method of aspect 10, wherein the traffic burst size is an estimated transport block size, the method further comprising: calculating the estimated transport block size based at least in part on a default burst size indicated in the quality of service profile.

Aspect 12: The method of any of aspects 1 through 11, wherein the traffic burst size is an average transport block size scheduled to the UE over a duration of time that accounts for one or more protocol headers of the application data traffic.

Aspect 13: The method of any of aspects 1 through 12, wherein the traffic burst size is based at least in part on a quantity of bits received at the base station, the UE, or both over a duration of time.

Aspect 14: The method of any of aspects 1 through 13, further comprising: scheduling a burst of the application data traffic within the time period that is a single slot, wherein the bandwidth size is determined based at least in part on the burst of the application data traffic being scheduling within the single slot.

Aspect 15: The method of any of aspects 1 through 14, further comprising: scheduling a burst of the application data traffic within the time period that is two or more slots based at least in part on the traffic burst size for the application data traffic being larger than a permitted burst size for a maximum bandwidth size of a single slot, wherein the bandwidth size allocated to the two or more slots comprises an entire bandwidth of a carrier for communicating the application data traffic based at least in part on the scheduling.

Aspect 16: The method of any of aspects 1 through 15, further comprising: establishing a communications session with the UE using a first bit rate for communicating the application data traffic, wherein the control signal indicates the first bandwidth part with the bandwidth size in accordance with the first bit rate; adjusting the communications session or establishing a second communications session with the UE using a second bit rate for the application data traffic; and transmitting a second control signal that indicates a second bandwidth part with a second bandwidth size in accordance with the second bit rate, the second bandwidth size being different than the bandwidth size.

Aspect 17: The method of any of aspects 1 through 16, wherein the application data traffic comprises split cross reality application data, the traffic burst size comprises an estimated traffic burst size, or any combination thereof.

Aspect 18: A method for wireless communications at a UE, comprising: transmitting, to a base station, an indication of a bandwidth size based at least in part on a traffic burst size for application data traffic within a time period; receiving, from the base station, a control signal indicating a first bandwidth part based at least in part on transmitting the indication of the bandwidth size; and communicating the application data traffic with the base station using the first bandwidth part based at least in part on the control signal.

Aspect 19: The method of aspect 18, wherein receiving the control signal comprises: receiving the control signal indicating the first bandwidth part with the bandwidth size determined based at least in part on the traffic burst size that is an estimated transport block size of the application data traffic.

Aspect 20: The method of any of aspects 18 through 19, wherein receiving the control signal comprises: receiving the control signal indicating the first bandwidth part with the bandwidth size determined based at least in part on the traffic burst size, wherein the bandwidth size is estimated corresponding a modulation order of the application data traffic.

Aspect 21: The method of any of aspects 18 through 20, wherein receiving the control signal comprises: receiving the control signal indicating the first bandwidth part with the bandwidth size determined based at least in part on the traffic burst size, wherein the bandwidth size is estimated corresponding to a target code rate applied to encode the application data traffic.

Aspect 22: The method of any of aspects 18 through 21, wherein receiving the control signal comprises: receiving the control signal indicating the first bandwidth part with the bandwidth size determined based at least in part on the traffic burst size, wherein the bandwidth size is estimated corresponding to a quantity of one or more spatial layers over which the application data traffic is transmitted.

Aspect 23: The method of any of aspects 18 through 22, wherein receiving the control signal comprises: receiving the control signal indicating the first bandwidth part with the bandwidth size determined based at least in part on the traffic burst size, wherein the bandwidth size is estimated corresponding to a quantity of one or more downlink symbols used for scheduling the application data traffic.

Aspect 24: The method of any of aspects 18 through 23, wherein receiving the control signal comprises: receiving the control signal indicating the first bandwidth part with the bandwidth size determined based at least in part on the traffic burst size, wherein the bandwidth size is estimated corresponding to a quantity of physical layer overhead corresponding to the application data traffic.

Aspect 25: The method of any of aspects 18 through 24, wherein receiving the control signal comprises: receiving the control signal indicating the first bandwidth part with the bandwidth size determined based at least in part on the traffic burst size that is one or more statistical metrics of a parameter of the application data traffic.

Aspect 26: The method of aspect 25, wherein a statistical metric of the one or more statistical metrics comprises an average of the parameter, a standard deviation of the parameter, a maximum of the parameter, or any combination thereof.

Aspect 27: The method of any of aspects 18 through 26, wherein the traffic burst size is based at least in part on a quantity of bits received at the base station, the UE, or both over a duration of time.

Aspect 28: The method of any of aspects 18 through 27, further comprising: receiving downlink control information indicating scheduling information for the application data traffic, wherein communicating the application data traffic is based at least in part on the indicated scheduling information.

Aspect 29: The method of any of aspects 18 through 28, wherein the UE comprises a cross reality device, the application data traffic comprises split cross reality application data traffic, the traffic burst size comprises an estimated traffic burst size, or any combination thereof.

Aspect 30: An apparatus for wireless communications at a base station, comprising a processor; memory coupled with the processor; and instructions stored in the memory and executable by the processor to cause the apparatus to perform a method of any of aspects 1 through 17.

Aspect 31: An apparatus for wireless communications at a base station, comprising at least one means for performing a method of any of aspects 1 through 17.

Aspect 32: A non-transitory computer-readable medium storing code for wireless communications at a base station, the code comprising instructions executable by a processor to perform a method of any of aspects 1 through 17.

Aspect 33: An apparatus for wireless communications at a UE, comprising a processor; memory coupled with the processor; and instructions stored in the memory and executable by the processor to cause the apparatus to perform a method of any of aspects 18 through 29.

Aspect 34: An apparatus for wireless communications at a UE, comprising at least one means for performing a method of any of aspects 18 through 29.

Aspect 35: A non-transitory computer-readable medium storing code for wireless communications at a UE, the code comprising instructions executable by a processor to perform a method of any of aspects 18 through 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network device comprising:
   selecting a first bandwidth part from a plurality of bandwidth parts, the first bandwidth part having a bandwidth size corresponding to a traffic burst size for application data traffic within a time period;
   transmitting, to a user equipment (UE), a control signal indicating the first bandwidth part having the bandwidth size corresponding to the traffic burst size, wherein the bandwidth size is estimated corresponding to a quantity of physical layer overhead corresponding to the application data traffic; and
   communicating the application data traffic with the UE using the first bandwidth part based at least in part on the transmitting.

2. The method of claim 1, wherein transmitting the control signal comprises:
   transmitting the control signal indicating the first bandwidth part with the bandwidth size corresponding to the traffic burst size that is an estimated transport block size of the application data traffic.

3. The method of claim 1, wherein transmitting the control signal comprises:
   transmitting the control signal indicating the first bandwidth part with the bandwidth size corresponding to the traffic burst size, wherein the bandwidth size is estimated corresponding to a modulation order of the application data traffic.

4. The method of claim 1, wherein transmitting the control signal comprises:
   transmitting the control signal indicating the first bandwidth part with the bandwidth size corresponding to the traffic burst size, wherein the bandwidth size is estimated corresponding to a target code rate applied to encode the application data traffic.

5. The method of claim 1, wherein transmitting the control signal comprises:
   transmitting the control signal indicating the first bandwidth part with the bandwidth size corresponding to the traffic burst size, wherein the bandwidth size is estimated corresponding to a quantity of one or more spatial layers over which the application data traffic is transmitted.

6. The method of claim 1, wherein transmitting the control signal comprises:

transmitting the control signal indicating the first bandwidth part with the bandwidth size corresponding to the traffic burst size, wherein the bandwidth size is estimated corresponding to a quantity of one or more downlink symbols used for scheduling the application data traffic.

7. The method of claim 1, wherein transmitting the control signal comprises:

transmitting the control signal indicating the first bandwidth part with the bandwidth size corresponding to the traffic burst size that is one or more statistical metrics of a parameter of the application data traffic.

8. The method of claim 1, further comprising:

receiving, from an access and mobility management function, a quality of service profile for the application data traffic, wherein the traffic burst size is estimated based at least in part on the quality of service profile.

9. The method of claim 8, wherein the traffic burst size is an estimated transport block size, the method further comprising:

calculating the estimated transport block size based at least in part on a default burst size indicated in the quality of service profile.

10. The method of claim 1, wherein the traffic burst size is an average transport block size scheduled to the UE over a duration of time that accounts for one or more protocol headers of the application data traffic.

11. The method of claim 1, wherein the traffic burst size is based at least in part on a quantity of bits received at the network device, the UE, or both over a duration of time.

12. The method of claim 1, further comprising:

scheduling a burst of the application data traffic within the time period that is a single slot, wherein the bandwidth size is determined based at least in part on the burst of the application data traffic being scheduling within the single slot.

13. The method of claim 1, further comprising:

scheduling a burst of the application data traffic within the time period that is two or more slots based at least in part on the traffic burst size for the application data traffic being larger than a permitted burst size for a maximum bandwidth size of a single slot, wherein the bandwidth size allocated to the two or more slots comprises an entire bandwidth of a carrier for communicating the application data traffic based at least in part on the scheduling.

14. The method of claim 1, further comprising:

establishing a communications session with the UE using a first bit rate for communicating the application data traffic, wherein the control signal indicates the first bandwidth part with the bandwidth size in accordance with the first bit rate;

adjusting the communications session or establishing a second communications session with the UE using a second bit rate for the application data traffic; and transmitting a second control signal that indicates a second bandwidth part with a second bandwidth size in accordance with the second bit rate, the second bandwidth size being different than the bandwidth size.

15. The method of claim 1, wherein the application data traffic comprises split cross reality application data, the traffic burst size comprises an estimated traffic burst size, or both.

16. A method for wireless communications at a user equipment (UE), comprising:

transmitting, to a network device, an indication of a bandwidth size based at least in part on a traffic burst size for application data traffic within a time period;

receiving, from the network device, a control signal indicating a first bandwidth part based at least in part on transmitting the indication of the bandwidth size determined based at least in part on the traffic burst size, wherein the bandwidth size is estimated corresponding to a quantity of physical layer overhead corresponding to the application data traffic; and communicating the application data traffic with the network device using the first bandwidth part based at least in part on the control signal.

17. The method of claim 16, wherein receiving the control signal comprises:

receiving the control signal indicating the first bandwidth part with the bandwidth size determined based at least in part on the traffic burst size that is an estimated transport block size of the application data traffic.

18. The method of claim 16, wherein receiving the control signal comprises:

receiving the control signal indicating the first bandwidth part with the bandwidth size determined based at least in part on the traffic burst size, wherein the bandwidth size is estimated corresponding a modulation order of the application data traffic.

19. The method of claim 16, wherein receiving the control signal comprises:

receiving the control signal indicating the first bandwidth part with the bandwidth size determined based at least in part on the traffic burst size, wherein the bandwidth size is estimated corresponding to a target code rate applied to encode the application data traffic.

20. The method of claim 16, wherein receiving the control signal comprises:

receiving the control signal indicating the first bandwidth part with the bandwidth size determined based at least in part on the traffic burst size, wherein the bandwidth size is estimated corresponding to a quantity of one or more spatial layers over which the application data traffic is transmitted.

21. The method of claim 16, wherein receiving the control signal comprises:

receiving the control signal indicating the first bandwidth part with the bandwidth size determined based at least in part on the traffic burst size, wherein the bandwidth size is estimated corresponding to a quantity of one or more downlink symbols used for scheduling the application data traffic.

22. The method of claim 16, wherein receiving the control signal comprises:

receiving the control signal indicating the first bandwidth part with the bandwidth size determined based at least in part on the traffic burst size that is one or more statistical metrics of a parameter of the application data traffic.

23. The method of claim 16, wherein the traffic burst size is based at least in part on a quantity of bits received at the network device, the UE, or both over a duration of time.

24. The method of claim 16, further comprising:

receiving downlink control information indicating scheduling information for the application data traffic, wherein communicating the application data traffic is based at least in part on the indicated scheduling information.

25. The method of claim 16, wherein the UE comprises a cross reality device, the application data traffic comprises split cross reality application data traffic, the traffic burst size comprises an estimated traffic burst size, or both.

26. An apparatus for wireless communications at a network device, comprising:

at least one processor, and at least one memory coupled with the at least one processor with instructions stored in the at least one memory, the instructions being executable by the at least one processor; to cause the apparatus to:

select a first bandwidth part from a plurality of bandwidth parts, the first bandwidth part having a bandwidth size corresponding to a traffic burst size for application data traffic within a time period;

transmit, to a user equipment (UE), a control signal indicating the first bandwidth part having the bandwidth size corresponding to the traffic burst size, wherein the bandwidth size is estimated corresponding to a quantity of physical layer overhead corresponding to the application data traffic;

schedule transmission of the application data traffic using the first bandwidth part; and communicate the application data traffic with the UE using the first bandwidth part based at least in part on the scheduling.

27. The apparatus of claim 26, further comprising a transceiver for transmitting the control signal, wherein the instructions to transmit the control signal are executable by the at least one processor, individually or in any combination, to cause the apparatus to:

transmit, via the transceiver, the control signal indicating the first bandwidth part with the bandwidth size corresponding to the traffic burst size that is an estimated transport block size of the application data traffic.

28. An apparatus for wireless communications at a user equipment (UE), comprising:

at least one processor, and at least one memory coupled with the at least one processor with instructions stored in the at least one memory, the instructions being executable by the at least one processor; to cause the apparatus to:

transmit, to a network device, an indication of a bandwidth size based at least in part on a traffic burst size for application data traffic within a time period;

receive, from the network device, a control signal indicating a first bandwidth part based at least in part on transmitting the indication of the bandwidth size determined based at least in part on the traffic burst size, wherein the bandwidth size is estimated corresponding to a quantity of physical layer overhead corresponding to the application data traffic; and communicate the application data traffic with the network device using the first bandwidth part based at least in part on the control signal.

* * * * *